(12) United States Patent
Wentink

(10) Patent No.: US 9,337,961 B2
(45) Date of Patent: May 10, 2016

(54) METHOD AND APPARATUS FOR SENDING VERY HIGH THROUGHPUT WLAN ACKNOWLEDGMENT FRAMES

(75) Inventor: Maarten Menzo Wentink, Naarden (NL)

(73) Assignee: Qualcomm Incorporated, San Diego, CA (US)

( * ) Notice: Subject to any disclaimer, the term of this patent is extended or adjusted under 35 U.S.C. 154(b) by 134 days.

(21) Appl. No.: 13/160,398

(22) Filed: Jun. 14, 2011

(65) Prior Publication Data

US 2011/0305176 A1   Dec. 15, 2011

Related U.S. Application Data

(60) Provisional application No. 61/355,114, filed on Jun. 15, 2010.

(51) Int. Cl.
  *H04W 28/12* (2009.01)
  *H04L 1/16* (2006.01)
  *H04L 12/801* (2013.01)

(52) U.S. Cl.
  CPC .......... *H04L 1/1607* (2013.01); *H04L 1/1621* (2013.01); *H04L 47/14* (2013.01); *H04W 28/12* (2013.01)

(58) Field of Classification Search
  None
  See application file for complete search history.

(56) References Cited

U.S. PATENT DOCUMENTS

| | | | | |
|---|---|---|---|---|
| 8,537,725 B1 * | 9/2013 | Zeng et al. | | 370/280 |
| 8,681,755 B2 * | 3/2014 | Kwon et al. | | 370/338 |
| 2005/0195858 A1 * | 9/2005 | Nishibayashi et al. | | 370/474 |
| 2006/0195629 A1 | 8/2006 | Sharma et al. | | |
| 2007/0110055 A1 * | 5/2007 | Fischer et al. | | 370/389 |
| 2007/0160040 A1 * | 7/2007 | Kwon | | 370/389 |
| 2007/0171933 A1 * | 7/2007 | Sammour et al. | | 370/447 |
| 2007/0206508 A1 * | 9/2007 | Sammour et al. | | 370/252 |
| 2010/0014448 A1 | 1/2010 | Wentink et al. | | |
| 2010/0016023 A1 * | 1/2010 | Yamauchi et al. | | 455/562.1 |
| 2010/0220678 A1 | 9/2010 | Wentink | | |
| 2011/0038332 A1 * | 2/2011 | Liu et al. | | 370/329 |
| 2012/0314682 A1 * | 12/2012 | Trainin | | 370/329 |

(Continued)

FOREIGN PATENT DOCUMENTS

| | | |
|---|---|---|
| CN | 1665195 A | 9/2005 |
| EP | 1571773 A2 | 9/2005 |

(Continued)

OTHER PUBLICATIONS

Lee, B. G. & Choi, S., "Broadband Wireless Access and Local Networks: Mobile WiMAX & WiFi", IEEE 802.11 Wireless LANs, Wireless Communication Series, 2008, pp. 1-108.

(Continued)

*Primary Examiner* — Timothy J Weidner
(74) *Attorney, Agent, or Firm* — Kevin T. Cheatham

(57) ABSTRACT

One of a normal acknowledgement (ACK) and block ACK may be selectively enabled for wireless transmissions using a Very High Throughput Physical Layer Protocol Data Unit (PPDU). At least one designated bit may be set in a Physical Layer header of the PPDU for transmission from a transmitter to a receiver to indicate an ACK type selected from at least two of a normal ACK, a Block ACK, or no ACK. The PPDU may be transmitted in a Very High Throughput frame to the receiver where the designated bit can be used to provoke a normal ACK or Block ACK response to the PPDU, depending on the bit value.

36 Claims, 19 Drawing Sheets

(56) References Cited

U.S. PATENT DOCUMENTS

2013/0188567 A1* 7/2013 Wang et al. .................. 370/329
2013/0301569 A1* 11/2013 Wang et al. .................. 370/329

FOREIGN PATENT DOCUMENTS

| JP | S5680748 A | 7/1981 |
| JP | 2005252897 A | 9/2005 |
| JP | 2006050519 A | 2/2006 |
| JP | 2013502157 A | 1/2013 |
| WO | WO-2009114484 A1 | 9/2009 |
| WO | WO-2010009046 | 1/2010 |
| WO | WO-2011019571 A1 | 2/2011 |

OTHER PUBLICATIONS

Huai-Rong Shao et al., "MAC-enabling technologies for high-throughput wireless LAN", Consumer Communications and Networking Conference, 2006, CCNC 2006, 20 06 3rd IEEE Las Vegas, NV, USA Jan. 8-10, 2006, Piscataway, NJ, USA,IEEE, vol. 1, Jan. 8, 2006, pp. 173-177, XP010893153, DOI: 10.1109/CCNC.2006.1593010 ISBN: 978-1-4244-0085-0.

International Search Report and Written Opinion—PCT/US2011/040575, ISA/EPO—Oct. 21, 2011.

* cited by examiner

605 ～ VHT-SIG-A

- Bandwidth — 4 bits
- SGI — 1 bit
- Not Sounding — 1 bit
- Smoothing — 1 bit
- Resolvable LTFs — 1 bit
- 600 ～ Group ID — 4 bits
- $N_{STS}$ (streams per STA) — 9 bits
- STBC — 1 bit
- CRC — 8 bits
- Tail — 6 bits
- Reserved — 12 bit Total — 48 bits

*FIG. 6*

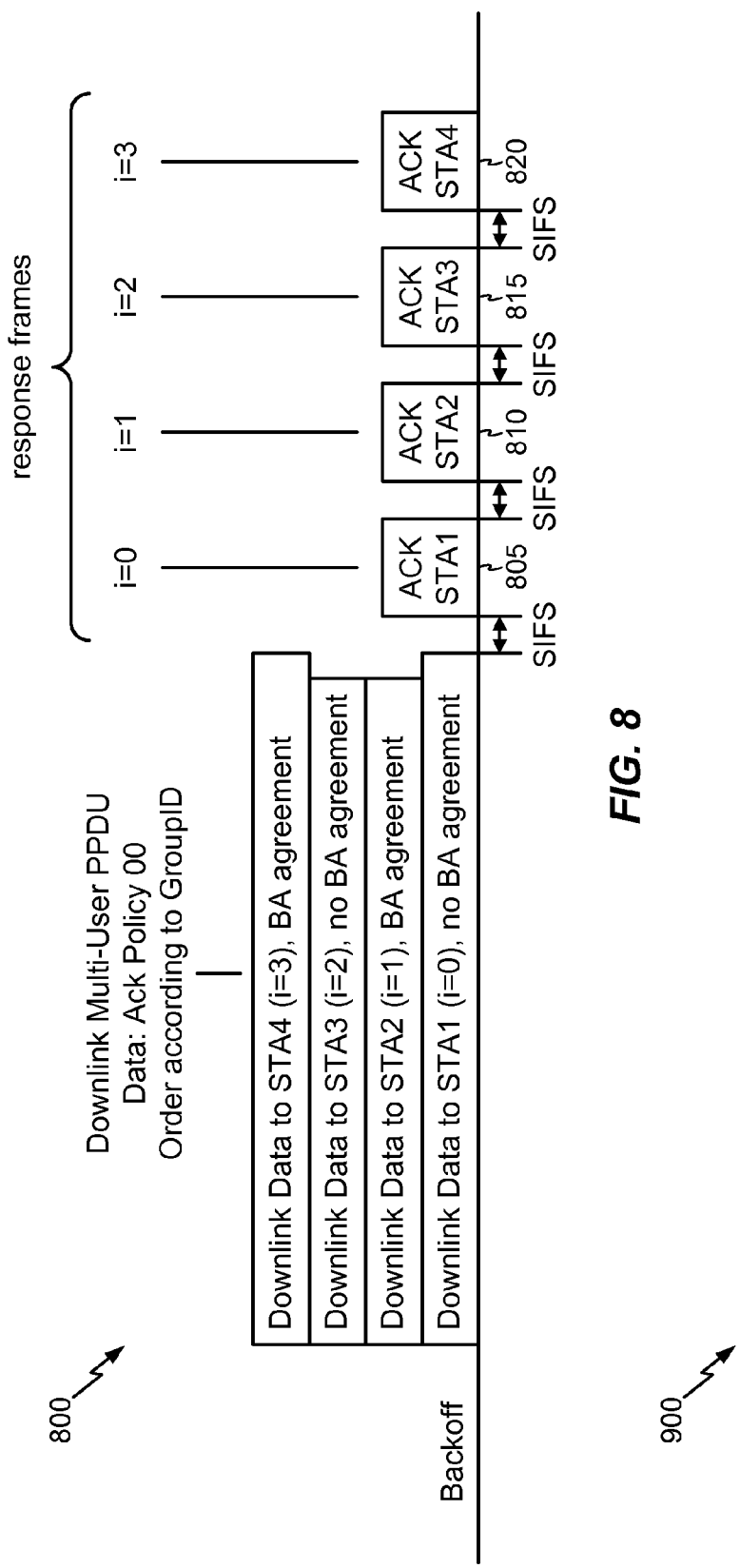
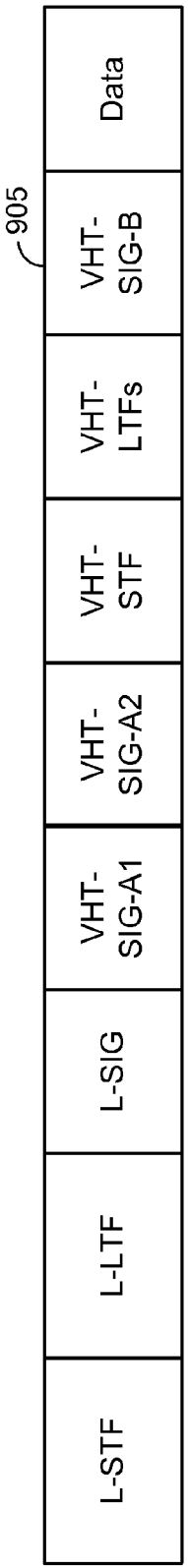
FIG. 8
FIG. 9

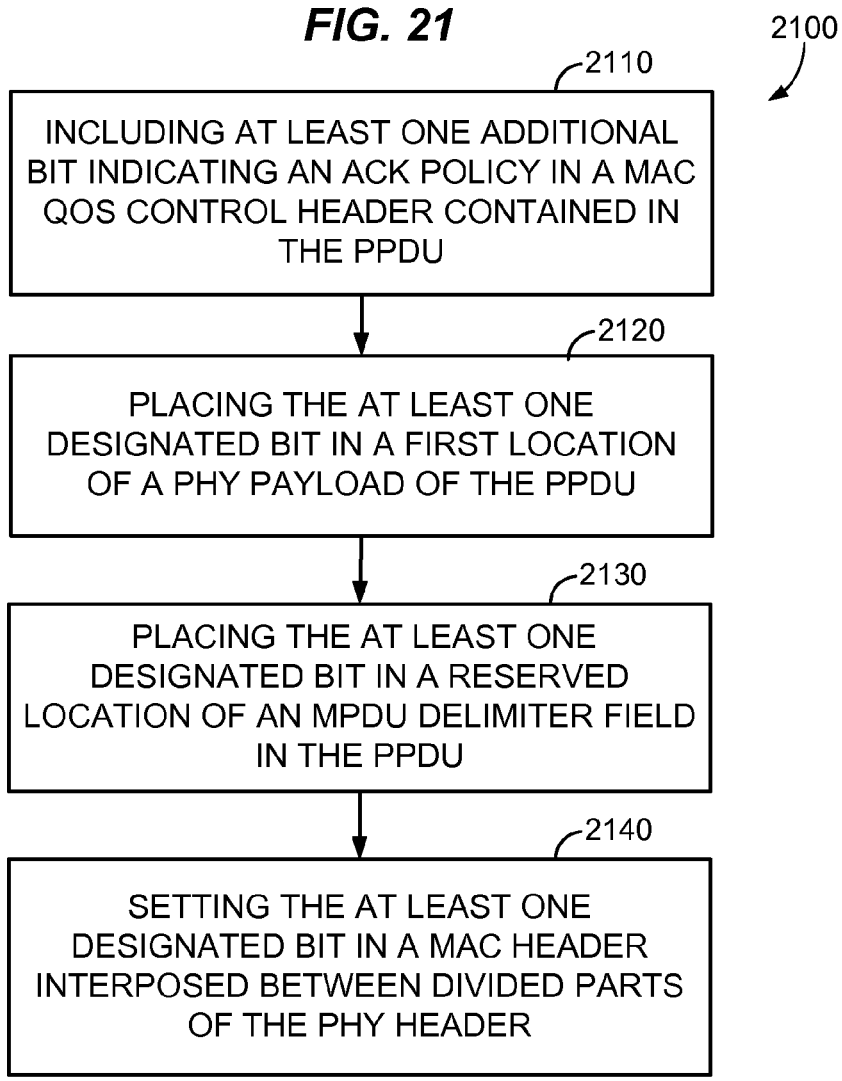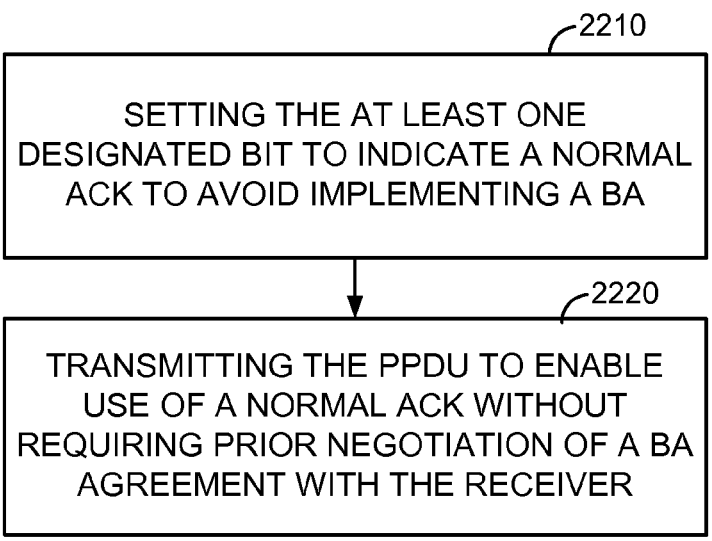

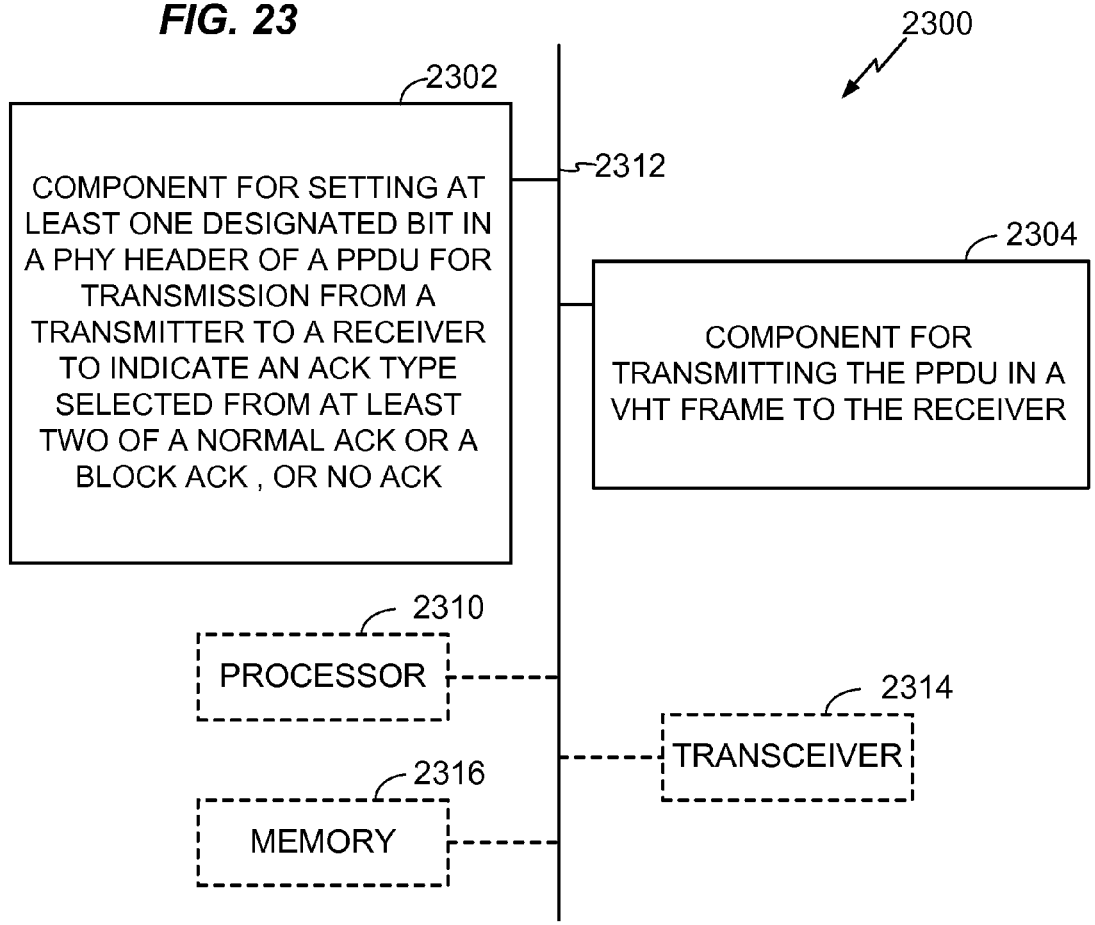
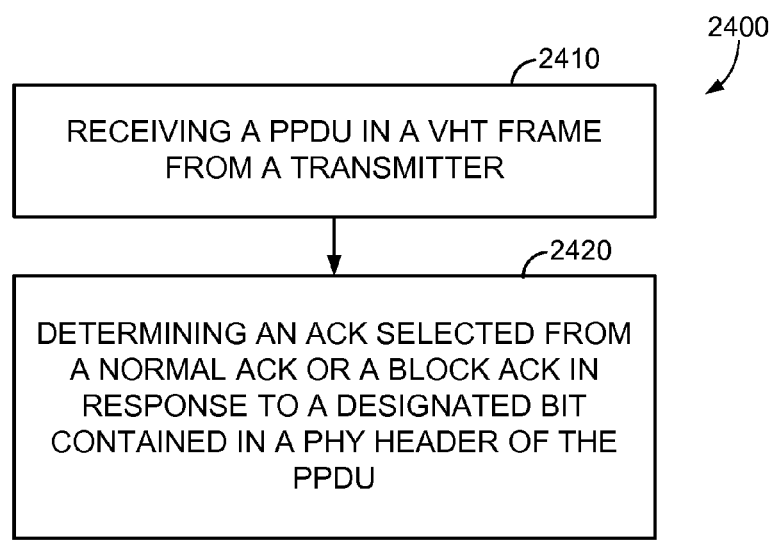

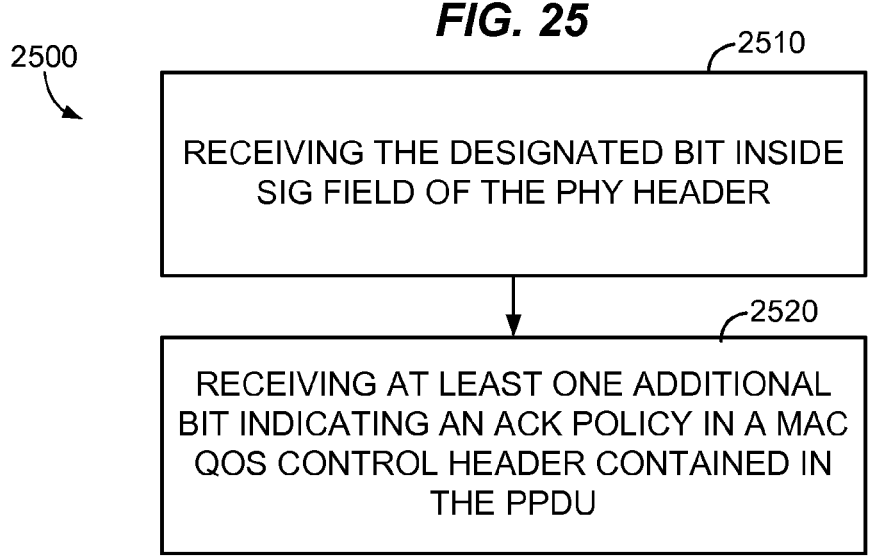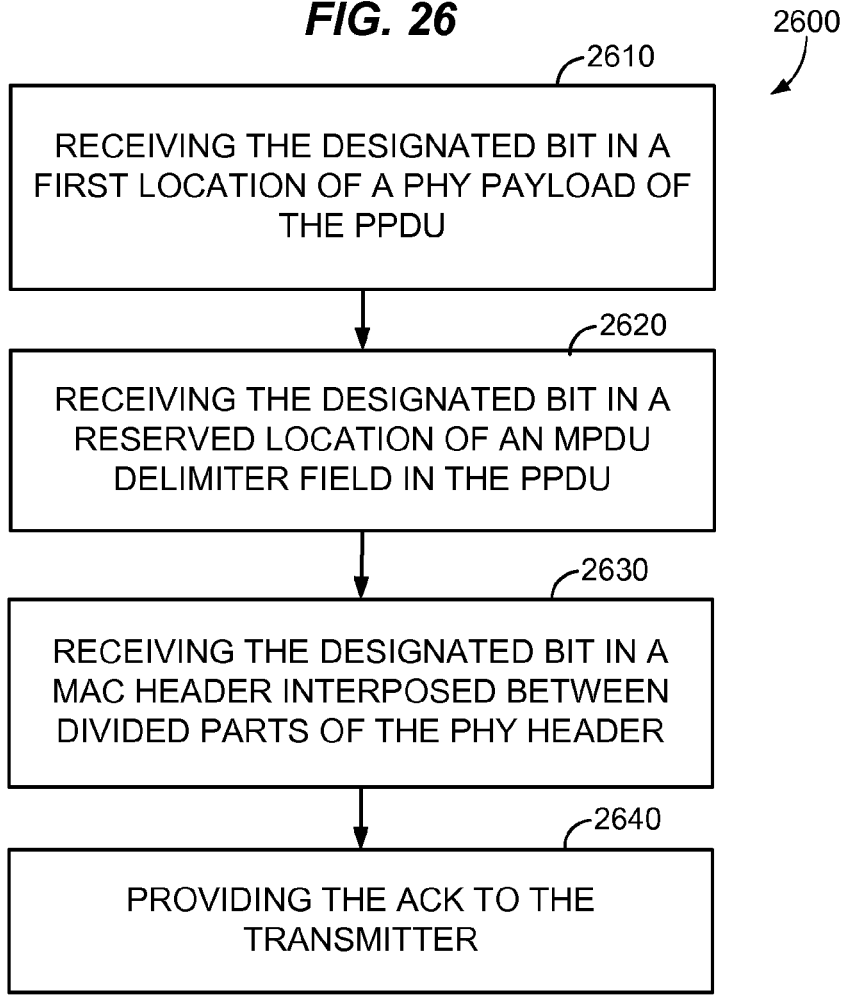

METHOD AND APPARATUS FOR SENDING VERY HIGH THROUGHPUT WLAN ACKNOWLEDGMENT FRAMES

CROSS REFERENCE TO RELATED APPLICATION

This application claims priority pursuant to 35 U.S.C. §119(e) to U.S. provisional application Ser. No. 61/355,114, filed Jun. 15, 2010, which application is specifically incorporated herein, in its entirety, by reference.

FIELD

The present invention generally relates to apparatus and methods for acknowledgments from a station in wireless local area network systems. More particularly, the disclosure relates to very high throughput acknowledgments and signaling mechanisms for communicating an acknowledgment policy to be used by a receiving station.

BACKGROUND

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for the next generation communication systems. MIMO technology has been adopted in several emerging wireless communications standards such as the Institute of Electrical Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters).

In wireless communications systems, medium access control (MAC) protocols are designed to operate to exploit several dimensions of freedom offered by the air link medium. The most commonly exploited dimensions of freedom are time and frequency. For example, in the IEEE 802.11 MAC protocol, the "time" dimension of freedom is exploited through the CSMA (Carrier Sense Multiple Access). The CSMA protocol attempts to ensure that no more than one transmission occurs during a period of potential high interference. Similarly, the "frequency" dimension of freedom can be exploited by using different frequency channels.

Recent developments have led to space as a dimension being a viable option to be used to increase, or at least more efficiently use, existing capacity. Spatial Division Multiple Access (SDMA) can be used for improving utilization of the air link by scheduling multiple terminals for simultaneous transmission and reception. Data is sent to each of the terminals using spatial streams. For example, with SDMA, a transmitter forms orthogonal streams to individual receivers. Such orthogonal streams can be formed because the transmitter has several antennas and the transmit/receive channel consists of several paths. Receivers may also have one or more antennas (MIMO, SIMO). For this example, it is assumed that the transmitter is an access point (AP) and the receivers are stations (STAs). The streams are formed such that a stream targeted at STA-B, for example, is seen as low power interference at STA-C, STA-D, . . . , etc., and this will not cause significant interference and most likely be ignored. In order to form these orthogonal streams, the AP needs to have channel state information (CSI) from each of the receiving STAs. Although CSI can be measured and communicated in several ways, thereby adding complexity, the use of CSI will optimize the configuration of SDMA streams.

Additional complexities arise when MIMO is applied to multi-user (MU) systems. For example, typically, the AP controls the uplink (UL) communication process. However, in certain configurations, the uplink scheduling approach still requires that STAs contend with the AP for channel access. In other words, the AP will act as an additional STA trying to gain access to the transmission medium, thereby affecting all STAs attempting to gain access. Further, as the STAs rely on the AP for scheduling of future UL transmissions, the scheduling scheme does not always work well with certain types of data traffic, such as bursty data traffic.

SUMMARY

To improve on these and other aspects of the prior art, a method is described herein for selectively enabling normal acknowledgement (ACK) and block ACK (BA) for wireless transmissions using Physical Layer Protocol Data Units (PPDUs). The method may include a transmitting station setting at least one designated bit in a Physical Layer (PHY) header of a PPDU for transmission from a transmitter to a receiver to indicate an ACK type selected from two of a normal ACK, a Block ACK (BA), or no ACK, and transmitting the PPDU in a Very High Throughput (VHT) frame to the receiver.

According to further aspects of the method, the station may place the at least one designated bit inside a Signal (SIG) field of the PHY header. In an aspect, the method may further include selecting the SIG field comprising a field that is transmitted to each of multiple receivers individually. In an alternative aspect, the method may include selecting the SIG field comprising a field that is transmitted to all of multiple receivers.

In another aspect, the method may include the transmitting station including at least one additional bit indicating an ACK policy in a Media Access Control (MAC) Quality of Service (QoS) control header contained in the PPDU. In the alternative, or in addition, the method may include the station placing the at least one designated bit in a first location of a Physical Layer (PHY) payload of the PPDU. In a further alternative, or in addition, the method may include the station placing the at least one designated bit in a reserved location of a Media Access Control Data Unit (MPDU) delimiter field in the PPDU. According to another alternative, or in addition, the method may include setting the at least one designated bit in a Media Access Control (MAC) header interposed between divided parts of the PHY header.

Generally, the method and alternatives may include the station setting the at least one designated bit to indicate a normal ACK to avoid implementing a BA. In the alternative, or in addition, the method may include the station transmitting the PPDU to enable use of a normal ACK without requiring prior negotiation of a BA agreement with the receiver.

A system according to any of the foregoing may include means for setting at least one designated bit in a Physical Layer (PHY) header of a PPDU for transmission from a transmitter to a receiver to indicate an ACK type selected from at least at two of a normal ACK, a Block ACK (BA), or no ACK coupled to means for transmitting the PPDU in a Very High Throughput (VHT) frame to the receiver. The system may include other means for performing other aspects and operations as described for the method described above for a transmitting station, including hardware, software, or firmware elements, or a combination of such elements, configured for performing the described operations.

For example, a system for facilitating evolved MBMS discovery in a wireless communications system WCS may include a processor configured for setting at least one designated bit in a Physical Layer (PHY) header of a PPDU for transmission from a transmitter to a receiver to indicate an ACK type selected from at least two of a normal ACK, a Block ACK (BA), or no ACK, and transmitting the PPDU in a Very High Throughput (VHT) frame to the receiver. The system may include a memory coupled to the at least one processor for storing data. For further example, a computer-readable medium may hold encoded instructions, that when executed by a processor of a transmitting station, causes the station to perform operations of a method as described above. The instructions may be held in a memory device, storage medium, or the like.

For a receiving station, a method for selecting one of a normal ACK and block ACK may include receiving a PPDU in a VHT frame from a transmitter. The method may include determining an ACK selected from a normal ACK or a Block ACK in response to a designated bit contained in a PHY header of the PPDU. In an aspect, the method may include receiving the designated bit inside a Signal (SIG) field of the PHY header. The method may further include receiving at least one additional bit indicating an ACK policy in a MAC QoS control header contained in the PPDU. The receiving station may provide an ACK to the transmitting station, according to the ACK type specified by the designated bit or bits in the PPDU.

In an alternative, the method may include receiving the designated bit in a first location of a PHY payload of the PPDU. For example, the method may include receiving the designated bit in a reserved location of an MPDU delimiter field in the PPDU. For further example, the method may include receiving the designated bit in a MAC header interposed between divided parts of the PHY header.

A system for selecting one of a normal ACK and block ACK may include means for receiving a PPDU in a VHT frame from a transmitter, coupled to means for determining an ACK selected from a normal ACK or a Block ACK in response to a designated bit contained in a PHY header of the PPDU. The system may include other means for performing other aspects and operations as described for the method described above for a receiving station, including hardware, software, or firmware elements, or a combination of such elements, configured for performing the described operations.

For example, a receiving station system for selecting one of a normal ACK and block ACK may include at least one processor configured for receiving a PPDU in a VHT frame from a transmitter, and determining an ACK selected from a normal ACK or a BA in response to at least one designated bit contained in a Physical Layer (PHY) header of the PPDU. The receiving station system may further include a memory coupled to the at least one processor for storing data. For further example, a computer-readable medium may hold encoded instructions, that when executed by a processor of a receiving station, causes the station to perform operations of a method as described above. The instructions may be held in a memory device, storage medium, or the like.

BRIEF DESCRIPTION OF THE DRAWINGS

FIG. 6 illustrates a Group ID subfield as part of a VHT-SIG-A field of an IEEE 802.11ac PHY header.

FIG. 8 illustrates a VHT frame exchange using a Normal ACK procedure in combination with the Block ACK procedure for a Multi-User (MU) transmission.

FIG. 9 illustrates an ACK Type field placed inside a VHT-SIG-B field of the VHT PHY header.

FIGS. 19-22 are flowcharts illustrating related methodologies for selectively enabling normal ACK and block ACK for wireless transmissions, using a PPDU.

FIG. 23 is a block diagram illustrating a system for performing a method or methods as shown in FIGS. 19-22.

FIGS. 24-26 are flowcharts illustrating related methodologies for selecting one of a normal ACK and block ACK for wireless transmissions, using a PPDU.

DETAILED DESCRIPTION

Figure 1:
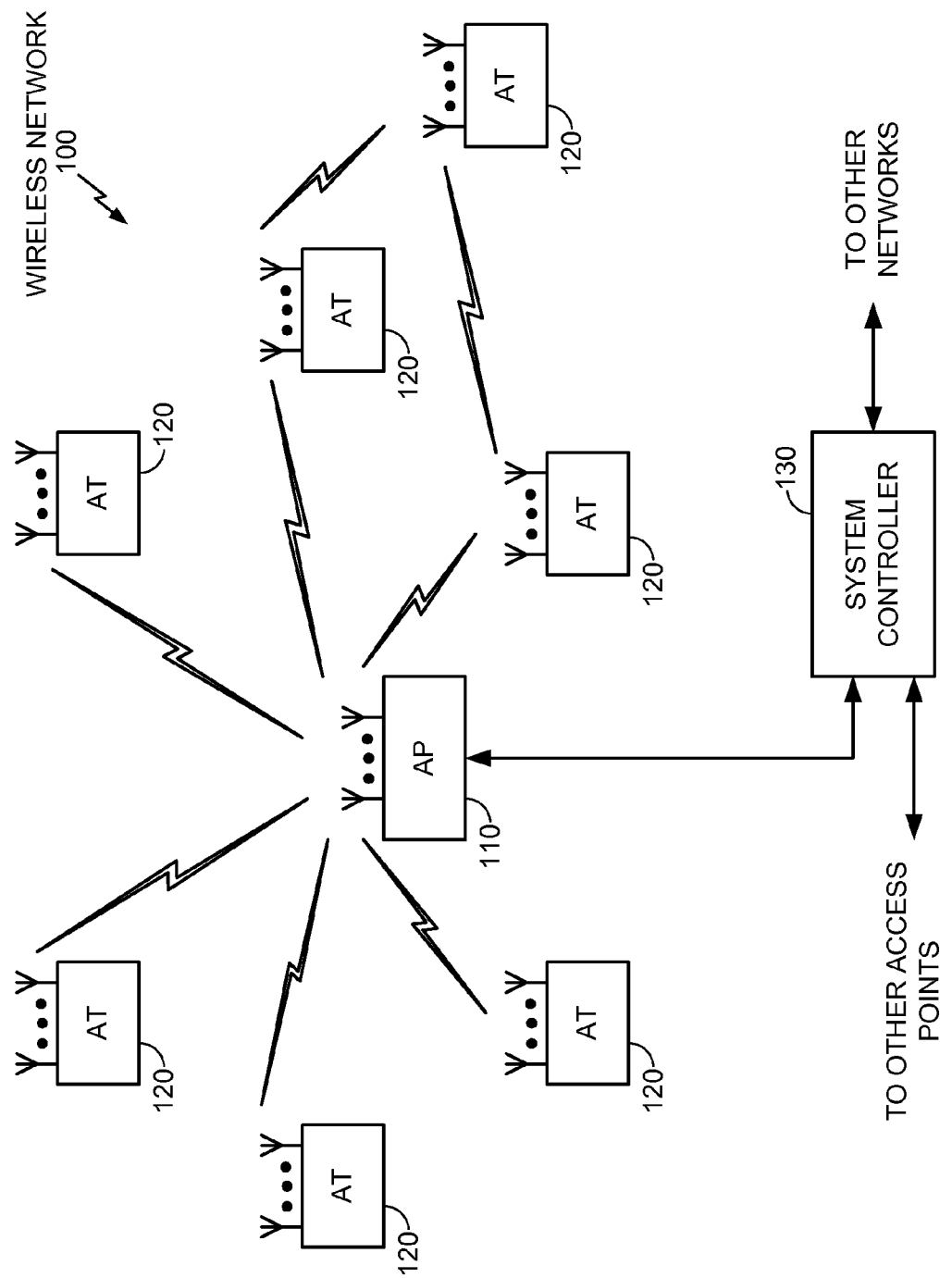
FIG. 1 shows a spatial division multiple access MIMO wireless system in accordance with certain embodiments of the present disclosure.

Several aspects of a wireless network will now be presented with reference to FIG. 1. The wireless network, which is also referred to herein as a basic service set (BSS) 100 is shown with several wireless nodes, generally designated as an access point 110 and a plurality of access terminals or stations (STAs) 120. Each wireless node is capable of receiving and/or transmitting. In the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or access terminal. By way of example, an access point may be referred to as a base station, an eNode B (eNB), a base transceiver station, a station, a terminal, a node, a wireless node, an access terminal acting as an access point, a network entity, or some other suitable terminology. An access terminal may be referred to as a user terminal, a mobile station, a subscriber station, a station, a wireless device, a terminal, a node, a wireless node, User Equipment (UE), a mobile entity or some other suitable terminology. The various concepts described throughout this disclosure are intended to apply to all suitable wireless nodes regardless of their specific nomenclature.

The wireless network 100 may support any number of access points distributed throughout a geographic region to provide coverage for access terminals 120. A system controller 130 may be used to provide coordination and control of the access points, as well as access to other networks (e.g., Internet) for the access terminals 120. For simplicity, one access point 110 is shown. An access point may generally be a fixed terminal that provides backhaul services to access terminals in the geographic region of coverage. However, the access point may be mobile in some applications. An access terminal, which may be fixed or mobile, utilizes the backhaul services of an access point or engages in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console, or any other suitable wireless node.

The wireless network 100 may support MIMO technology. Using MIMO technology, an access point 110 may communicate with multiple access terminals 120 simultaneously using Spatial Division Multiple Access (SDMA). SDMA is a multiple access scheme which enables multiple streams transmitted to different receivers at the same time to share the same frequency channel and, as a result, provide higher user capacity. This is achieved by spatially precoding each data stream and then transmitting each spatially precoded stream through a different transmit antenna on the downlink. The spatially precoded data streams arrive at the access terminals with different spatial signatures, which enable each access terminal 120 to recover the data stream destined for that access terminal 120. On the uplink, each access terminal 120 transmits a spatially precoded data stream, which enables the access point 110 to identify the source of each spatially precoded data stream. It should be noted that although the term "precoding" is used herein, in general, the term "coding" may also be used to encompass the process of precoding, encoding, decoding and/or postcoding a data stream.

One or more access terminals 120 may be equipped with multiple antennas to enable certain functionality. With this configuration, for example, multiple antennas at the access point 110 may be used to communicate with a multiple antenna access point to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high data rate signal.

While portions of the following disclosure will describe access terminals that also support MIMO technology, the access point 110 may also be configured to support access terminals that do not support MIMO technology. This approach may allow older versions of access terminals (e.g., "legacy" terminals) to remain deployed in a wireless network, extending their useful lifetime, while allowing newer MIMO access terminals to be introduced as appropriate.

Figure 2:
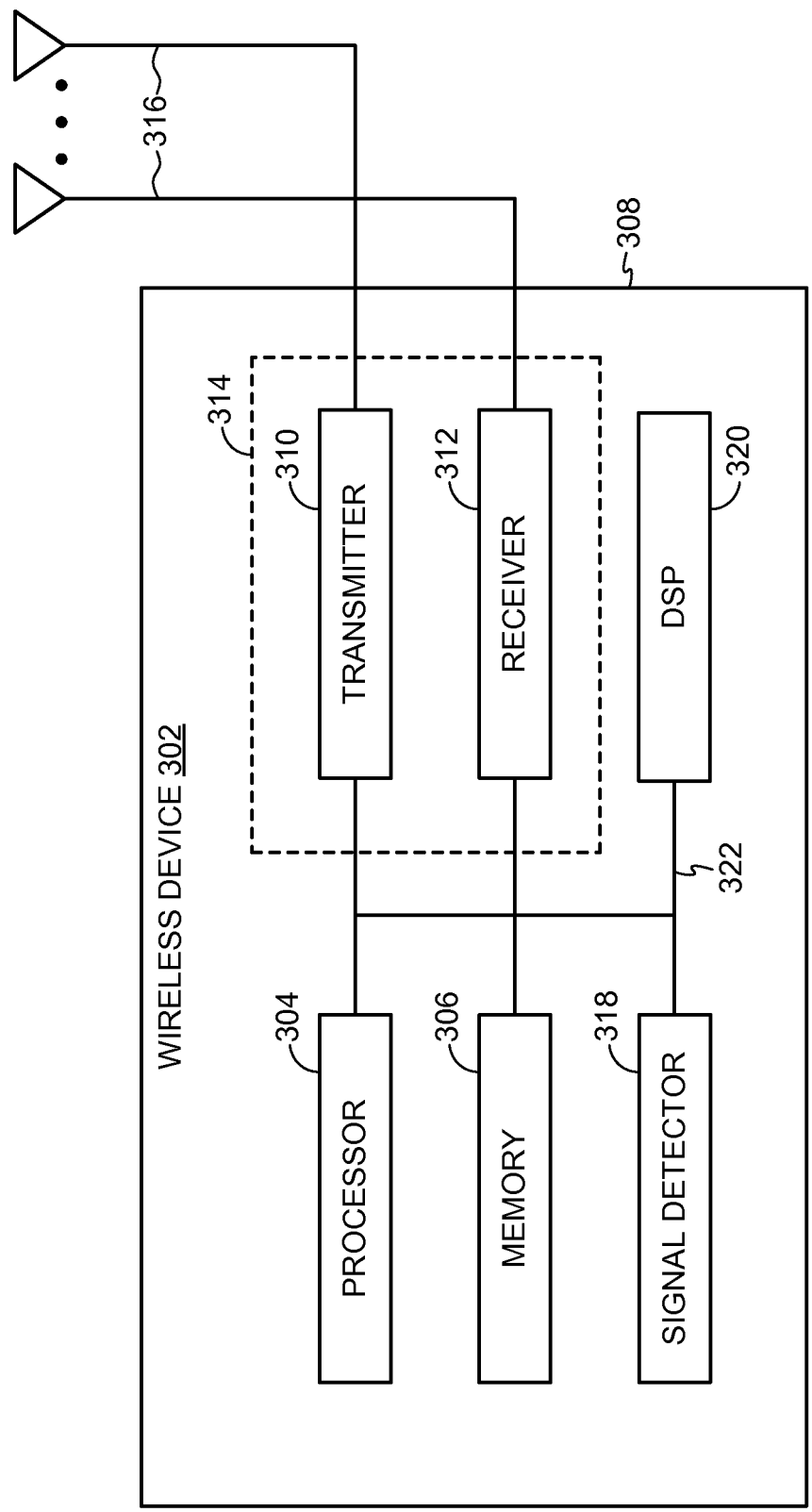
FIG. 2 illustrates example components of a wireless device in accordance with certain embodiments of the present disclosure.

FIG. 2 illustrates various components that may be utilized in a wireless device 302 that may be employed within the system 100. The wireless device 302 is an example of a device that may be configured to implement the various methods described herein. The wireless device 302 may be configured to function as an access point 110 or a user terminal 120.

The wireless device 302 may include a processor 304 which controls operation of the wireless device 302. The processor 304 may also be referred to as a central processing unit (CPU). Memory 306, which may include both read-only memory (ROM), random access memory (RAM), or other memory type, may provide instructions and data to the processor 304. A portion of the memory 306 may also include non-volatile random access memory (NVRAM). The processor 304 may perform logical, input/output (I/O) and arithmetic operations based on program instructions stored within the memory 306. The instructions in the memory 306 may be executable to implement the methods described herein.

The wireless device 302 may also include a housing 308 that may enclose or support a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314. The wireless device 302 may include (not shown) multiple transmitters, multiple receivers, and multiple transceivers the same as or similar to those shown.

The wireless device 302 may also include a signal detector 318 that may be used to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

As used herein, the term "legacy" as used in connection with wireless network protocols or nodes generally refers to protocols or nodes that support 802.11n or earlier versions of the 802.11 standard.

While certain techniques are described herein with reference to SDMA, those skilled in the art will recognize the techniques may be generally applied in systems utilizing any type of multiple access schemes, such as SDMA, OFDMA, CDMA, and combinations thereof.

In the detailed description that follows, various aspects of the disclosure will be described with reference to a MIMO system supporting any suitable wireless technology, such as Orthogonal Frequency Division Multiplexing (OFDM). OFDM is a spread-spectrum technique that distributes data over a number of subcarriers spaced apart at precise frequencies. The spacing provides "orthogonality" that enables a receiver to recover the data from the subcarriers. An OFDM system may implement IEEE 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may implement IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this disclosure are not limited to any particular wireless technology and/or air interface standard.

Acronyms

The acronyms listed below may be used herein, consistent with commonly recognized usages in the field of wireless communications. Other acronyms may also be used herein, and if not defined in the list below, are defined where first appearing herein.

| | |
|---|---|
| ACK | Acknowledgement |
| A-MPDU | Aggregated Media Access Control Protocol Data Unit |
| AP | Access Point |
| BA | Block ACK |
| BAR | Block ACK Request |
| CRC | Cyclic Redundancy Check |
| EOF | End of Frame |
| FCS | Frame Check Sequence |
| ID | Identifier |
| IEEE | Institute of Electrical and Electronic Engineers |
| LTF | Long Training Field |
| MAC | Media Access Control |
| MSB | Most Significant Bit |
| MIMO | Multiple Input Multiple Output |
| MPDU | MAC Protocol Data Unit |
| MU | Multi-User |
| MU-MIMO | Multi-User Multiple Input Multiple Output |
| OFDM | Orthogonal Frequency Division Modulation |
| OFDMA | Orthogonal Frequency Division Multiple Access |
| PHY | Physical Layer |
| PLCP | Physical Layer Convergence Protocol |
| PPDU | PLCP Protocol Data Unit |
| PSDU | PLCP Service Data Unit |
| QoS | Quality of Service |
| SDMA | Spatial-Division Multiple Access |
| SIFS | Short Interframe Space |
| SIG | Signal |
| STA | Station |
| STBC | Space-Time Block Coding |
| STF | Short Training Field |
| SU | Single User |
| TCP | Transmission Control Protocol |
| VHT | Very High Throughput |
| WLAN | Wireless Local Area Network |

The references IEEE 802.11-2007 and IEEE 802.11n-2009 may provide helpful background information, and are known in the art.

Wireless LAN networks based on IEEE 802.11 standards continue to evolve to allow for higher throughput which may be realized by parallel transmissions to multiple stations at once, or by using a wider channel bandwidth such as 80 MHz or 160 MHz. The wireless standard IEEE 802.11ac currently under development specifies a VHT WLAN. The payload of an IEEE 802.11ac PPDU generally contains an A-MPDU by default, allowing multiple MPDUs in a single PPDU for reducing protocol timing overhead.

As specified by IEEE 802.11ac, acknowledgement of a VHT PPDU may be limited to a Block Acknowledgement, which acknowledges multiple MPDUs present in the PPDU. Typically, a block acknowledgment agreement is required before VHT frames may be sent, and may be defined using one or more bits to signal an ACK policy. The prior approach as specified in various versions of IEEE 802.11 has been to include an ACK policy bit in an MPDU and to reserve all bits in the PPDU header for specifying the PPDU itself. However, a normal acknowledgement policy for a VHT PPDU is not defined by IEEE 802.11ac. Instead, a BA policy is defined because a VHT frame generally contains an A-MPDU and use of a BA policy is beneficial for reducing overhead.

The present disclosure describes various technologies (e.g., methods, apparatus, systems and computer program products) for enabling both normal ACK and Block ACK for wireless transmissions. The various technologies disclosed herein include aspects of implicit ACK policy signaling, and explicit ACK policy signaling. The implicit ACK policy signaling may include overloading an acknowledgment policy field in a MAC header of an MPDU. The explicit ACK policy signaling may include providing a specific signaling bit (or bits) in a PHY header of a VHT PPDU to selectively enable or disable a normal ACK. Additionally, the various technologies may include providing a rule defining when a normal ACK should be sent and when the normal ACK should not be sent. For example, a rule may specify that a normal ACK should be transmitted when all MPDUs and all non-End-Of_Field (non-EOF) MPDU delimiters have been received without error.

Aspects of the disclosure may be described as using transmissions occurring between two STAs. Because an AP generally is regarded to be a special type of STA in IEEE 802.11 WLANs, it is to be appreciated that the transmissions could also occur between AP to AP, AP to STA or STA to AP. STA to STA transmissions are used by way of illustration and not limitation.

Implicit ACK Policy Signaling With Normal or Block ACK

In certain embodiments, an ACK Policy for an MPDU may be signaled through an ACK Policy field of a Quality of Service (QoS) Control field within a Media Access Control (MAC) header, hereinafter also referred to as an MPDU header. The ACK Policy field may consist of bits 5 and 6 of the QoS Control field.

Bits b5 and b6 of a QoS Control field of a MAC header may be redefined to add a Normal ACK policy for VHT frames. Normal ACK or Block ACK may be implicitly signaled based on certain conditions such as the type of transmission sent by the sending STA and the presence or absence of a Block ACK agreement between the sending STA and receiving STA, for example as described in more detail below. Use of the ACK Policy field, e.g., bits b5 and b6 of the QoS Control field of a MAC header, to implicitly signal an ACK type may be referred to herein as the ACK Policy 00, wherein "00" indicates that both bits b5 and b6 are set to zero. Implicitly signaling the ACK type based on certain pre-defined conditions may be referred to herein as overloading ACK Policy 00.

For example, ACK Policy 00 may implicitly signal a Normal ACK Policy for VHT PPDUs when no block acknowledgment agreement is present between the sending and receiving STAs or to a Block Acknowledgment Policy when a block acknowledgment agreement is present between the sending and receiving STAs. In such case, if receiving a non-VHT frame that is not a A-MPDU frame, the addressed recipient may return an ACK or QoS+CF-ACK frame after a short interframe space (SIFS) period. If receiving a non-VHT frame that is part of an A-MPDU, the addressed recipient may return a BlockACK MPDU, either individually or as part of an A-MPDU, starting a SIFS after the PPDU carrying the frame. If receiving a VHT PPDU without a BlockACK agreement, the addressed recipient may return an ACK or QoS+CF-ACK frame after a SIFS period when no FCS error has occurred on any of the received MPDUs and no CRC error has occurred on any of the received MPDU delimiters. If receiving a VHT PPDU with a BlockACK agreement, the addressed recipient may return a BlockACK MPDU, either individually or as part of an A-MPDU starting a SIFS after the PPDU carrying the frame.

According to the foregoing example, when no Block ACK agreement has been negotiated between the sender and the receiver of a VHT PPDU and for the Traffic Identifier (TID)

associated with the transmitted MPDUs, the receiving STA responds with an ACK frame when no Frame Check Sequence (FCS) error has occurred on any of the received MPDUs and no Cyclic Redundancy Check (CRC) error has occurred on any of the MPDU delimiters contained in the PPDU. The response may be sent after a Short Interframe Space (SIFS) between the end of the received frame and the response. It is to be appreciated that the CRC check may only apply to MPDU delimiters with a zero End of Frame (EOF) field.

When one or more MPDUs or MPDU delimiters have been received in error, the receiving STA may not send an ACK frame. This may cause the sending STA to retransmit all MPDUs contained in the VHT PPDU.

When a Block ACK agreement has been negotiated between the sending STA and the receiving STA for the TID associated with the MPDUs of the VHT PPDU, the STA receiving the VHT PPDU may respond with a Block ACK frame.

Multi-User ACK Sequence Control Via PPDU PHY Header

New IEEE 802.11 standards such as IEEE 802.11ac will allow parallel transmissions from the Access Point (AP) to several stations (STAs) at once. Such transmissions are generally referred to as Multi-User (MU) transmissions, as opposed to the existing Single User (SU) transmissions. As discussed above, MU transmissions may for instance use Multi-User Multiple Input Multiple Output (MU-MIMO), which is also referred to as Spatial Division Multiple Access (SDMA). In this method, the AP sends data to each STA using different spatial streams. An issue that arises in MU transmissions is how the STAs determine their response position, hereinafter referred to also as "response location" or "location," in a sequence of response frames for sending acknowledgments.

Acknowledgments from the set of STAs that have been addressed as part of a MU transmission may be transmitted in sequence. The response frames (typically Block Acknowledgment frames) are sent sequentially after the end of the MU transmission.

Figure 3:
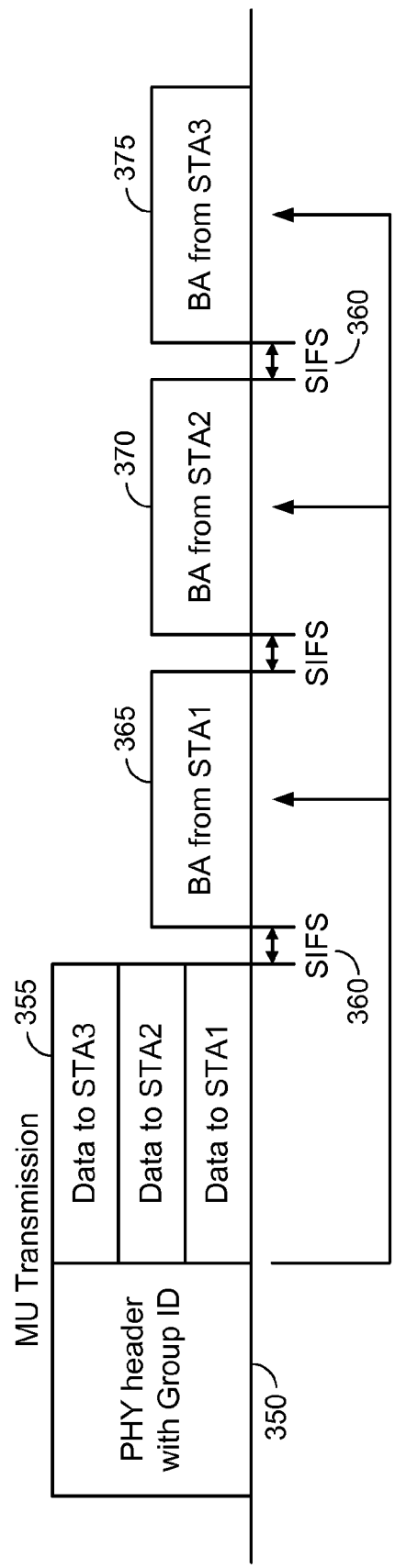
FIG. 3. illustrates an order of response frames from a set of stations determined by the order in which the stations occur in a group of stations to which a multi-user transmission is sent.

In an alternative, the order of the STA inside a predefined group to which the MU transmission is sent, or an ordering of spatial streams the STA is assigned to receive the MU transmission on, may be used to determine the order of each STA's response frame in a sequence of response frames sent after the end of the MU transmission. For example, the order of the STA in a MU-MIMO group to which the MU PPDU is sent, as defined in a PHY header 350 of a PPDU, may be used to determine the position of a STA's response frame in a sequence of response frames, as depicted in FIG. 3. The AP may assign STAs to various groups, each group being associated with a group ID. Each group typically defines an order of STAs. For example, group 1 may be defined as STA1, STA2, STA3; group 2 may be defined as STA2, STA1, STA3; group 3 may be defined as STA5, STA6, STA7; etc.

A STA may be a member of multiple groups. The group(s) to which a particular STA belongs may be assigned by the AP at the time the STA registers with the AP or at some other time. The ordering within a group may be implicitly defined or explicitly defined. For example, the AP may explicitly order the STAs within a group and communicate this ordering to the STAs within the group. The ordering may be communicated to the member STAs each time a STA is added to the group. The STAs may store this group ordering for future reference. A Group ID may be utilized to refer to a particular group. The Group ID may also be communicated to the member STAs by the AP. In one embodiment, the AP may send a management frame containing a list of group IDs and STAs associated with each Group ID.

The Group ID may be contained in a field inside a PHY header 350 of a MU transmission 355 that may be used by the STAs to determine their location inside a subsequent spatial stream assignment field. This same group sequence may be used to determine the order in which the response frames are transmitted by the STAs after the end of the MU frame. Thus, in a MU transmission to group 1, the response frames occur in the following order: a response frame 365 from STA1, followed by a response frame 370 from STA2, followed by a response frame 375 from STA3. For a MU transmission addressed to group 2, STA 2 sends its response frame after the end of the MU transmission, followed by a response frame from STA1, followed by a response frame from STA3. The response frames may be spaced SIFS time intervals 360 apart.

STAs may also base their location in the sequence of response frames on the spatial streams on which they receive data, independent of the way in which the spatial streams are assigned by the AP. Spatial streams may typically be assigned in sequential order, which simplifies the determination of the order in the sequence. The order of the response frames from the addressed STAs may be determined by the order of the STAs in the group to which the MU transmission is sent. The order of the STAs also determines the assignment of spatial streams on which the STAs listen to receive their data contained in the MU transmission.

The Normal ACK or Implicit Block ACK Request ACK Policy may be redefined to mean Sequential ACK when the MPDU is part of an MU PPDU. MPDUs inside an 802.11ac SU transmission may use the original definition of the ACK Policy (as if the MPDU was a legacy transmission), or the MPDUs may use Sequential ACK, which in this case reduces to a single SIFS response. Both interpretations have the same result, namely that a single SIFS response occurs, but when Sequential ACK applies there is an option to change the existing ACK rules.

When a Sequential ACK Policy is used, as may be signaled by an ACK Policy subfield of the QoS Control field of the MAC header, the order of the BA frame in the response sequence may be determined by the order of the STAs in the group for which the downlink MU packet is destined (e.g., based on the Group ID of the MU PPDU).

Use of ACK Policy In MU Transmission—Example

Figure 4:
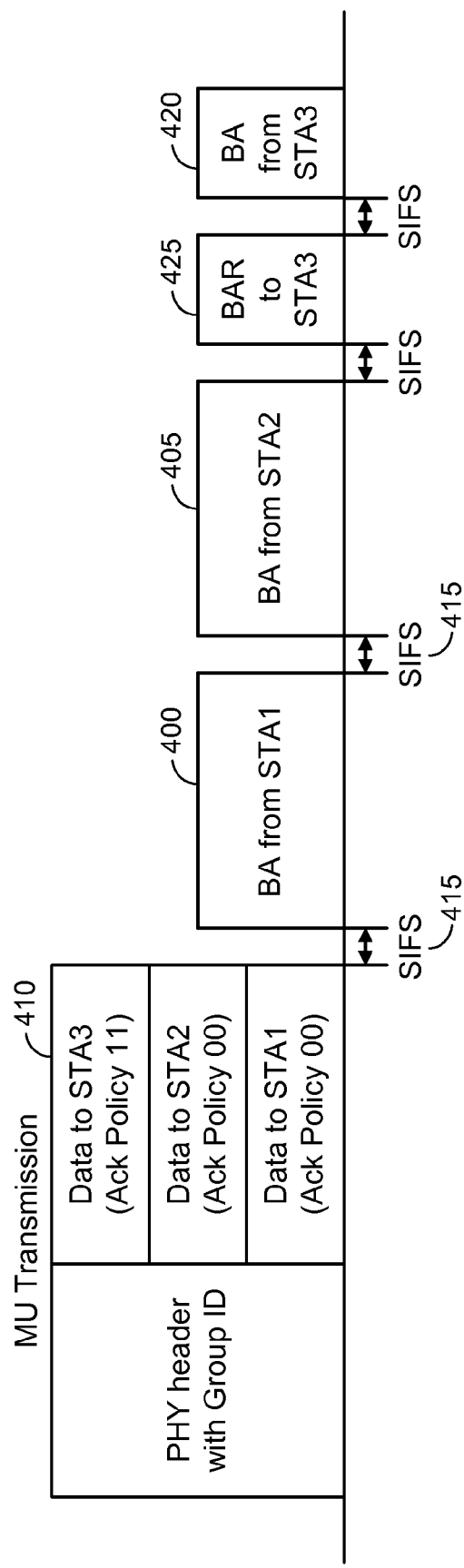
FIG. 4 illustrates an order of response frames from a set of stations that receive a Sequential ACK Policy in a multi-user transmission.

FIG. 4 depicts an example of a use of the ACK Policy field for a MU transmission. STA1 and STA2 each receive an ACK Policy equal to 00 in their respective MAC headers and each respond with a BA frame according to the Sequential ACK rules. STA3 receives an ACK Policy equal to 11 in its MAC header and takes no action upon receipt of the frame except to record the state. STA3 waits for a poll frame from the AP before sending a response frame. Note that the ACK Policy may be different for each STA because the MAC header for distinct destinations may be different. Further, in an MU transmission, each STA generally only sees packets that are destined to that station.

Note that the order of the responses from STA1 and STA2 are determined by the order of the STAs in the group for which the downlink MU packet is destined, for example the group ID may indicate an order of the STAs as STA1, STA2, STA3. STA1 responds with a BA frame 400 at a time increment of SIFS 415 after the end of the MU transmission 410. Then STA2 responds with a BA frame 405 at a time increment of SIFS 415 after the end of the BA frame from STA1. STA3 responds with a BA frame 420 after receipt of a BAR frame 425 transmitted by the AP.

Figure 5:
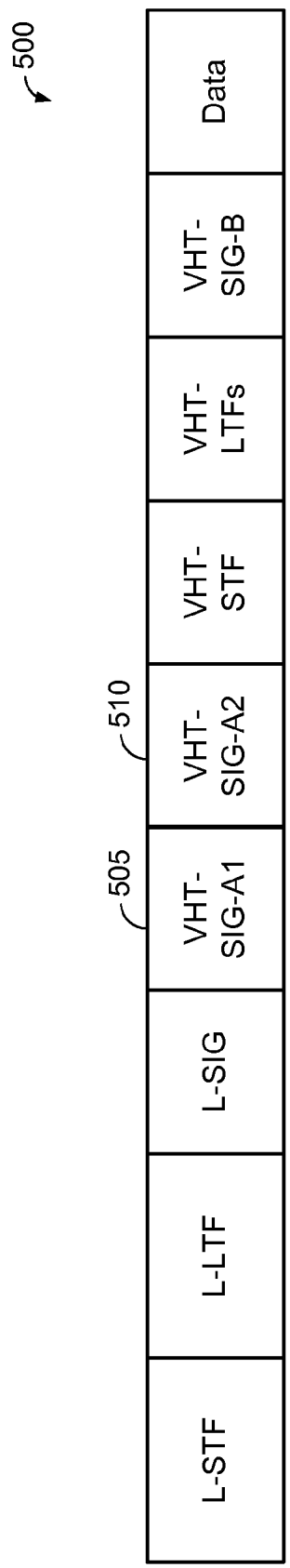
FIG. 5 illustrates an example of an IEEE 802.11ac PHY header.

An example of a IEEE 802.11ac PHY header 500 configuration is illustrated in FIG. 5. The VHT-SIG-A1 505 and VHT-SIG-A2 510 fields together may be referred to as VHT-SIG-A. As illustrated in FIG. 6, the Group ID subfield 600 may be part of the VHT-SIG-A field 605.

The Group ID subfield 600 may be used to identify the group of STAs to which an IEEE 802.11ac frame is transmitted. Each STA typically looks at the PHY header to determine if it should continue decoding the transmission or ignore the rest of the transmission. For example, a STA may look at the Group ID. If the STA is not a member of that particular group it may ignore the rest of the transmission.

Implicit ACK Policy Signaling With Normal, Block or Sequential ACK

An alternative way of redefining bits b5 and b6 of the QoS Control field of the MAC header may add a Normal ACK policy and a Sequential ACK policy for VHT frames. As in the alternative implicit signaling embodiment described above, overloading an ACK Policy subfield, e.g. ACK Policy 00, may be used to implicitly signal the ACK policy. As noted above in connection with FIG. 4, Sequential ACK is an acknowledgement procedure in which each STA may be assigned an index corresponding to the order in which the response frames (ACK or Block ACK) should be transmitted. The ACK Policy field may be used to implicitly signal an ACK type that is referred to herein as the ACK Policy 00, wherein "00" indicates that both bits b5 and b6 are set to zero. Implicitly signaling the ACK type based on certain pre-defined conditions may be referred to herein as overloading ACK Policy 00.

For example, ACK Policy 00 may implicitly request a response selected from a Normal ACK, Implicit Block ACK or Sequential ACK. The pre-defined conditions may include receiving a non-VHT frame that is not a A-MPDU frame. Under such condition, the addressed recipient may return an ACK or QoS+CF-ACK frame after a short interframe space (SIFS) period. The pre-defined conditions may include receiving a non-VHT frame that is part of an A-MPDU. Under such condition, the addressed recipient may return a Block ACK MPDU, either individually or as part of an A-MPDU, starting a SIFS after the PPDU carrying the frame. The pre-defined conditions may include receiving a VHT frame without a negotiated Block ACK agreement. Under such condition, the addressed recipient may return an ACK or QoS+CF-ACK frame after a short interframe space (SIFS) period after determining that no FCS error has occurred on any of the received MPDUs and no CRC error has occurred on any of the received MPDU delimiters. The pre-defined conditions may include receiving a VHT frame with a negotiated Block ACK agreement. Under such condition, the addressed recipient may return a Block ACK MPDU, either individually or as part of an A-MPDU, starting a SIFS after the PPDU carrying the frame. The pre-defined conditions may include receiving a Multi-User (MU) VHT frame. Under such condition, a recipient STA may determine its designated order in a response frame sequence from the order in which the STA occurs in the MU group to which the MU PPDU containing this ACK Policy subfield is sent. In the alternative, a recipient STA may determine its designated order in a response frame sequence from the order of the spatial streams that are assigned to the STA to listen to as part of the MU transmission. Accordingly, when transmitting a MU VHT frame, a Sequential ACK may be indicated by setting the ACK policy subfield bits b5 and b6 to "00."

General Aspects of Implicit ACK Policy Signaling

Certain embodiments, as discussed above, may implement an ACK Policy by overloading a certain ACK Policy QoS Control subfield, e.g., ACK Policy 00, to implicitly signal an ACK type. In certain embodiments an ACK type may be implicitly signaled via bits b5 and b6 of the QoS Control field of the MAC header based on certain enumerated conditions. These enumerated conditions may include the existence of a Block ACK agreement between the sending STA and the receiving STA. In one embodiment, for a VHT PPDU with MPDUs containing the 00 ACK Policy, the enumerated conditions may be that when no Block ACK agreement exists between the STAs for a relevant TID of the MPDUs, the receiving STA returns an ACK when no reception errors have occurred; when a Block ACK agreement is in place between the STAs and for the TID of the MPDUs, the receiving STA returns a Block ACK indicating sequence numbers of received MPDUs; when the MPDUs are part of a SU transmission, the receiving STA sends the response frame SIFS after the end of the received frame; when the MPDUs are part of a MU transmission, each receiving STA sends the response frame SIFS after the preceding response frame, according to a STA order that may be defined in the GroupID field.

As noted above a TID is a Traffic Identifier, which typically indicates the priority of a frame. The TID may be contained in the QoS Control field of the MAC header of each PPDU. A Block ACK agreement may be set up between STAs by setting up a Traffic Specifier (TSPEC). A TSPEC may be set up using a management frame exchange called Add TSPEC (ADDTS) Request and ADDTS Response. The exchange may be used to negotiate parameters associated with the Block ACK agreement, such as the size of a reorder buffer at the receiving STA and the TID for which the Block ACK agreement is set up.

Normal ACK in Single-User Transmission

Figure 7:
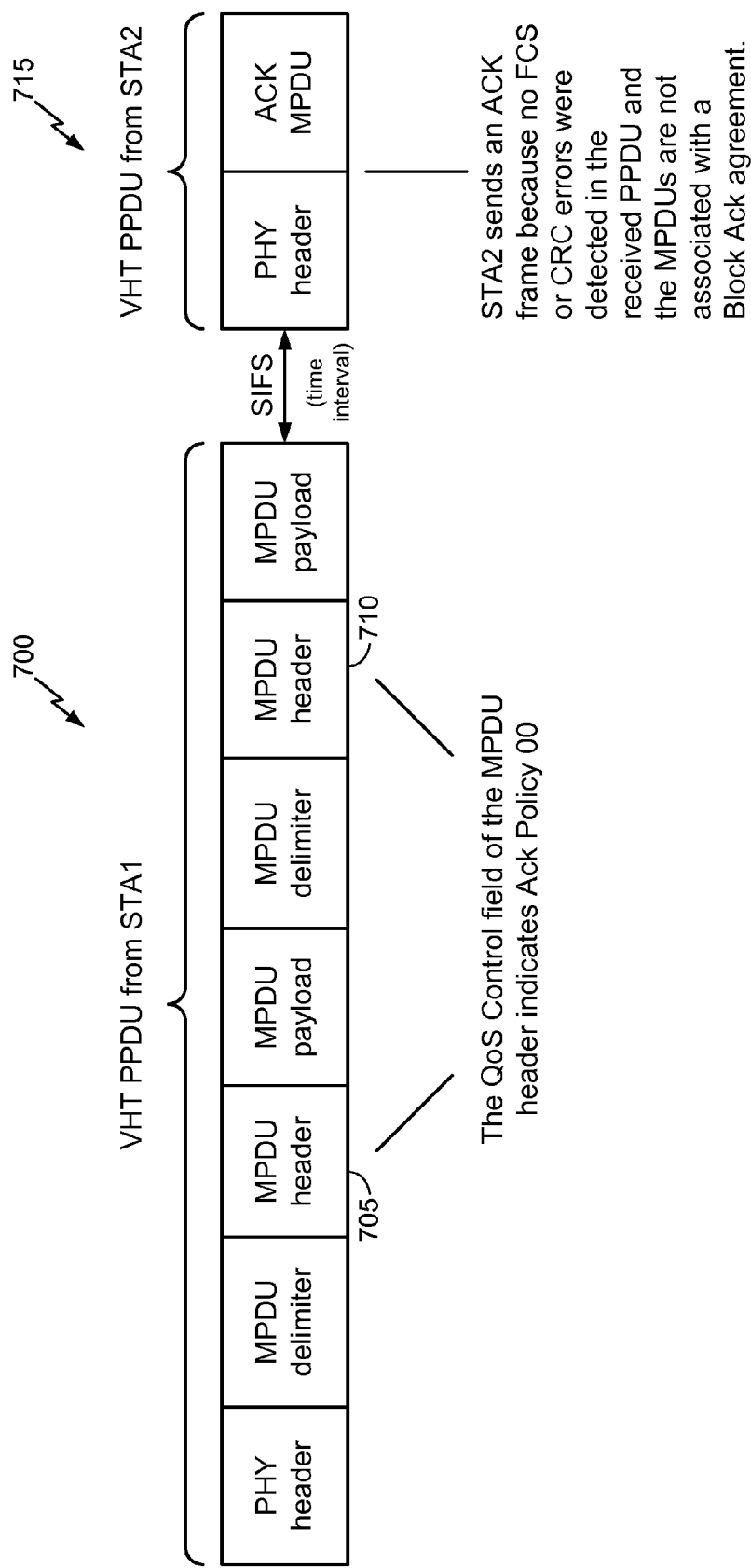
FIG. 7 illustrates a VHT frame exchange using a Normal ACK procedure for a Single User (SU) transmission.

An exemplary VHT frame exchange using the Normal ACK procedure for a Single User (SU) transmission is illustrated in FIG. 7. As depicted in FIG. 7, STA1 sends a VHT PPDU 700. The MPDU headers 705, 710 have the QoS Control field set to indicate ACK Policy 00. In this scenario, when there is no Block ACK agreement in place between STA1 and STA2, STA2 may send an ACK frame 715 SIFS after the end of the PPDU 700 when no FCS errors are detected in the received PPDUs and no CRC errors are detected in any of the received MPDU delimiters.

Normal ACK in Multi-User Transmission

FIG. 8 depicts an exemplary VHT frame exchange using the Normal ACK procedure in combination with the Block ACK procedure for a Multi-User (MU) transmission. As illustrated in FIG. 8, the response to MPDUs inside the MU PPDU 800 may be dependent on whether or not a Block ACK (BA) agreement is present. Receiving stations STA1 and STA3 do not have BA agreements with the sending STA. Receiving stations STA2 and STA4 have BA agreements with the sending station. Note that Sequential ACK is used in the illustrated example, consistent with a MU VHT frame being transmitted with ACK Policy 00. The order of the responses by the stations may be determined according the STA order defined in the Group ID field (e.g., STA1, STA2, STA3, STA4) in the PHY header of the PPDU 800. As illustrated in FIG. 8, STA1 sends a normal ACK 805 SIFS after the end of the MU PPDU 800. Then STA 2 sends a Block ACK 810 SIFS after the response from STA1. Then STA3 sends a normal ACK 815 SIFS after the response from STA3 STA2, which is then followed by a Block ACK 820 from STA4.

As noted above, existing VHT protocol does not provide for a normal ACK policy and may be limited to use of a block ACK policy for an A-MPDU. Typically, a block ACK agreement has to be in place between the sending STA and receiving STA before VHT frames can be sent. In contrast, the above embodiments generally do not require that a block ACK agreement be negotiated prior to sending VHT frames.

It is to be appreciated that sequential and polled ACK, previously discussed, may generally be independent of whether or not a block ACK agreement is in place. Whether or not there is an agreement may be used to determine what kind of ACK or BA will be sent, generally without changing the sequence of ACK responses to a PPDU. As described, the sequence of ACL responses may be determined using the PPDU PHY header.

Explicit ACK Policy Signaling Using PPDU PHY Header

In certain embodiments, rather than overloading one or more ACK Policy fields to implicitly signal an ACK type, an ACK Type field may be included inside a VHT PPDU to explicitly signal an ACK type. This may be contrary to traditional uses of a PPDU PHY header, which are limited to specifying aspects of the PPDU itself. In these embodiments, information that is not specifically related to the PPDU itself, for example an ACK policy, may be included in the PHY header. In the alternative, or equivalently, MAC information may be interspersed with PHY header information. For example, a PHY header may be split into two or more separate parts and MAC information interposed between the separate parts. Advantageously, both approaches enable MAC information to be transmitted earlier in a PPDU than would otherwise be possible. Such uses of a PPDU PHY header are not necessarily limited to signaling ACK policy as described in more detail below.

An ACK Type field included inside a VHT PPDU may indicate whether a requested response to the PPDU should be an ACK frame or a BlockACK frame. For example, the requested response may be an ACK frame when the ACK Type field is 0 and a BlockACK frame when the ACK Type field is a 1. Note that in certain embodiments implementing a Normal ACK Policy, an ACK frame may only be sent when no errors have occurred in any of the received MPDUs and MPDU delimiters in the PPDU. One exception to this approach may be to exclude MPDU delimiters transmitted after an MPDU delimiter containing an EOF indication.

The ACK Type field may be one bit or multiple bits. Further, various embodiments may locate the ACK Type field in various locations within the PHY header. Additionally, in certain embodiments, the ACK Type field may be used with or without making use of QoS Control field bits in an MPDU MAC header as described herein. When only one way of signaling the ACK policy is used, then both the sender and receiver generally will know how to handle sending and receiving the ACK Policy. In the event that multiple mechanisms may be allowed to signal the ACK Policy, then the sending STA may generally inform the receiving STA about which mechanism is being used. In some cases, the signaling mechanism may be apparent without specific signaling, such as setting a bit to the value of 1 in a delimiter. In other cases, specific signaling may be used, for example by including an additional field in the QoS control field. In other cases, the specific signaling may be performed using a priority agreement or additional indication bits in a preamble.

In an embodiment, the ACK Type field may be placed inside a Signal (SIG) field of the Physical layer (PHY) header. In this embodiment, as illustrated in FIG. 9, the ACK Type field may be placed inside a VHT-SIG-B field 905 of the VHT PHY header 900. This has the advantage that for a MU packet, the VHT_SIG-B field is transmitted to each receiver individually as opposed to the VHT-SIG-A fields, which are sent to all receiving devices. Therefore, use of the VHT-SIG-B field 905 allows the ACK type to be different for each receiver.

Combination Explicit and Implicit ACK Policy Signaling

An ACK Type field in a PHY header of a PPDU may be used in combination with ACK Policy fields of a MAC QoS Control header to signal an ACK Policy to be used for a transmission, as summarized below. The single-bit ACK Type field may be combined with two bits used for implicit signaling, for example bits b5 and b6 of a QoS Control field of a MAC header, to convey additional information. The three bits may be summarized herein as a triplet of binary values, e.g., "000," "100," "010," etc., wherein the first value represents a value of the ACK Type field in a PHY header, and the last two values represent the ACK policy bits. For example, the triplet "010" should be interpreted herein as meaning that the ACK Type bit value is zero, the first ACK policy bit value is one, and the last ACK policy bit is zero. It should be appreciated that the ACK Type bit is not generally transmitted contiguously with the ACK policy bits, and the triplet nomenclature is for illustrative convenience only.

By way of example only, and not by way of limitation, the aforementioned three bits may be used in combination, as follows. A triplet value of "000" may be set in the PPDU to indicate a Normal ACK request. In response to receiving a PPDU containing a "000" triplet, the addressed recipient may return an ACK or QoS+CF-ACK frame after a short interframe space (SIFS) period, after determining that no FCS error has occurred on any of the received MPDUs and no CRC error has occurred on any of the received MPDU delimiters. A triplet value of "100" may be set in the PPDU to indicate an implicit Block ACK request. In response to receiving a PPDU containing a "100" triplet, the addressed recipient may return a BlockACK MPDU, either individually or as part of an A-MPDU starting a SIFS after the PPDU carrying the frame. A triplet value of "010" may be set in the PPDU to indicate a no ACK request. In response to receiving a PPDU containing a "010" triplet, the addressed recipient may return no frame after SIFS. A triplet value of "111" may be set in the PPDU to indicate an explicit Block ACK request. In response to receiving a PPDU containing a "111" triplet, the addressed recipient may take no action upon the receipt of the frame except for recording the state. The recipient can expect a BlockAckReq frame in the future. The remaining triplet values "001," "011," "101" and "110" may be reserved for other purposes, remain unused, or used as duplicate indicators for any of the ACK requests summarized above.

In certain embodiments, the ACK Policy field of the QoS Control header may be ignored when an ACK Type field is present elsewhere in the PPDU. This may allow bits b5 and b6 of the QoS Control field to be reused for other purposes.

In other embodiments, the ACK Type field may be implemented by redefining the ACK Policy bits of QoS Control fields contained in VHT PPDUs. For example, bit b5 of the QoS Control field of an MPDU contained in a VHT PPDU may be defined as an ACK Type field. This may allow bit b6 of the QoS Control field to be used for other purposes.

In yet another embodiment, the ACK Type field may be one of the reserved bits of the MPDU delimiter, for instance bit 0. Additional information regarding MPDU reserved bits may be found in IEEE 802.11n.

Implementation of ACK Policy Signaling With Jumbo Frames

The PHY header may indicate a length of the MPDU contained in the VHT PPDU, in which case an MPDU delimiter may be omitted from the frame and a single MPDU may be contained inside the MPDU. This may be done to allow a Jumbo frame or a large Aggregated MAC Service Data Unit (A-MSDU) to be placed in the MPDU.

In certain embodiments, the PHY header may contain an ACK Type field but no length field. In these embodiments, the ACK Type field may be set to 0 (indicating Normal ACK) to signal that the first field of the PPDU payload is an MPDU length field. This may enable a VHT PPDU containing a single MPDU to not have to start with an MPDU delimiter. This may be advantageous because the MPDU length field of the MPDU delimiter typically restricts the maximum size of the MPDUs to 4096 octets. Such a length restriction implies that no Jumbo frame (9000 octets or larger) may be included after an MPDU delimiter without changing the length field. This may avoid changes to the receiving STA that otherwise may be required to explicitly change the MPDU length field.

Explicit ACK Policy Signaling Using PHY Payload

Figure 10:
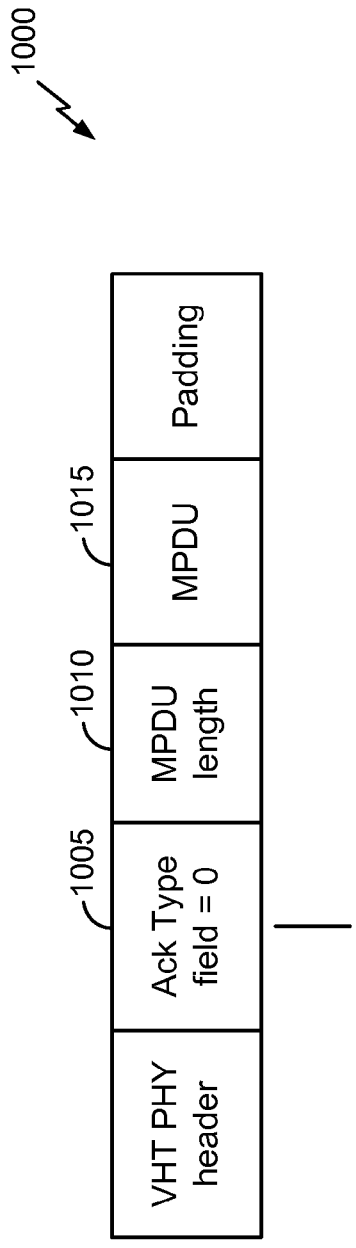
FIG. 10 illustrates the use of the first bit of the MAC payload of a VHT frame (e.g., of the PHY Service Data Unit (PSDU)) for the ACK Policy field.
Figure 11:
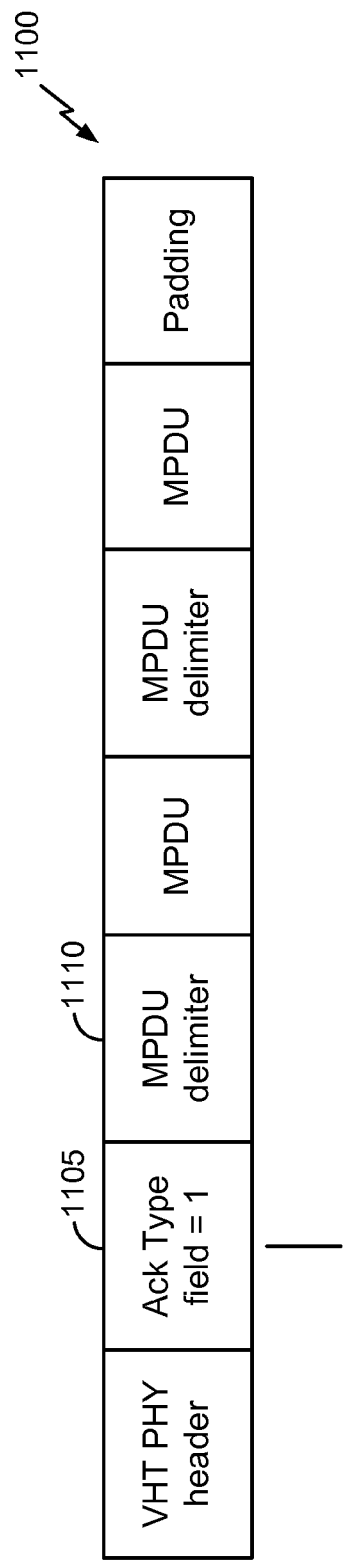
FIG. 11 illustrates a Block ACK policy implemented by placing a value of 1 in the ACK Policy field of a VHT frame.

As depicted in FIG. 10, in certain embodiments, a first bit 1005 of the MAC payload of a VHT frame 1000 (e.g., of the PHY Service Data Unit (PSDU)) may be used for the ACK Type field. The ACK Type field may be set to 0 to indicate Normal ACK. The second field may be an MPDU length field 1010 indicating the length of the pending MPDU 1015. After the MPDU length field may be the MPDU 1015. As depicted in FIG. 11, a value of 1 in the ACK Type field 1105 of a VHT frame 1100 may be used to indicate that a Block ACK policy has been implemented. The next element after the ACK Policy field may be an MPDU delimiter 1110.

Figure 12:
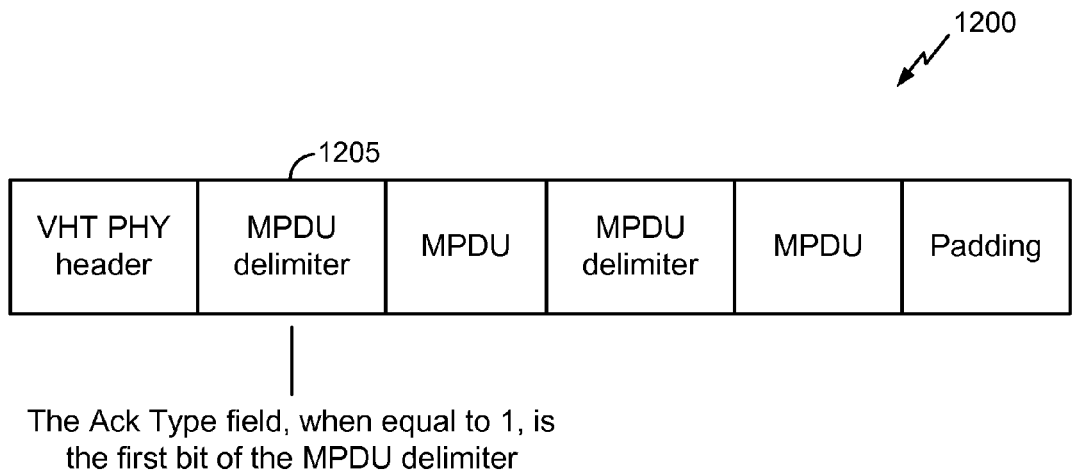
FIG. 12 illustrates an embodiment where an ACK Type field is placed on a reserved bit of the MPDU delimiter of a VHT frame.

Referring to FIG. 12, in certain embodiments, the ACK Type field may be placed on a reserved bit of the MPDU delimiter 1205 of a VHT frame 1200 (for instance bit 0). When the ACK Type field is 1, the field may be included as part of an MPDU delimiter. When the ACK Type is set to a value of 0, the ACK Type field may not be part of an MPDU delimiter but instead be followed by an MPDU length field, as illustrated in FIG. 10.

In these embodiments, a single MPDU carried inside a VHT PPDU may be larger than the maximum length possible with a pre-defined MPDU delimiter, for example, larger than 4096 octets. Further, the MPDU delimiter length field may not have to be modified to carry larger MPDU payloads in single MPDU frames.

The ACK Type fields depicted in FIGS. 10, 11 and 12 may be advantageously defined in a VHT frame by using an ACK Type field set to a value of 1 to indicate a Normal ACK with the presence of an MPDU length field. An ACK Type field set to a value of 0 may be used to indicate a Block ACK with the presence of an MPDU delimiter (either after the ACK Type field or with the ACK Type field being part of the MPDU delimiter).

Defining the meaning of these bits in this way may allow a STA that does not support Normal ACK to not modify its MPDU delimiter, based on the general assumption that reserved bits are set to 0 upon transmission. Note that in other embodiments, the meaning of the bits may be reversed (1 instead of 0 and 0 instead of 1) when the reserved bits are set to 1 upon transmission.

Explicit ACK Policy Signaling Using Various MPDU Bits

In certain embodiments, in VHT frames, bits 8-15 of the QoS Control field may be redefined to contain an ACK Type field and an MPDU length field for ACK Type 0 (Normal ACK). The length field may override a length provided in the preceding MPDU delimiter in this case, so that the MPDU delimiter format does not have to be modified.

Figure 13:
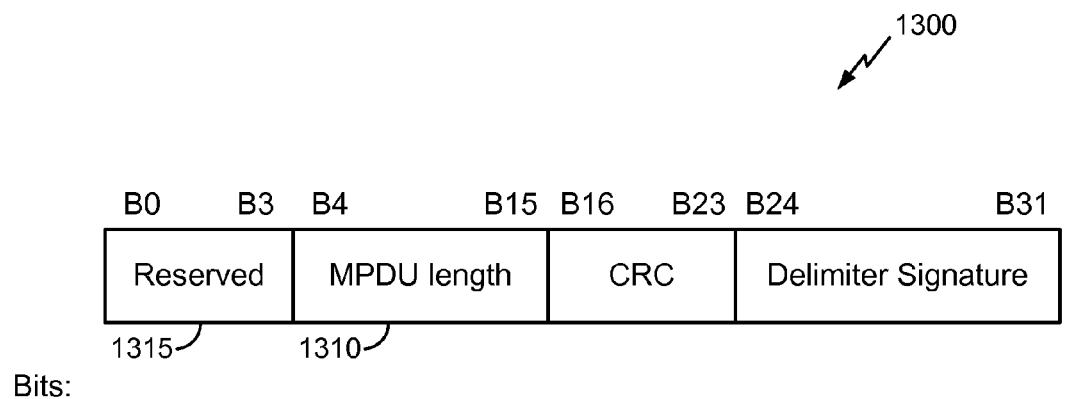
FIG. 13 illustrates a representative MPDU delimiter field of a MAC header.

FIG. 13 depicts a representative MPDU delimiter field 1300 of a MAC header. In certain embodiments, the Normal ACK policy may be indicated by setting the EOF field of the MPDU first delimiter to a value of 1 (indicating end of frame) and the MPDU length field 1310 to a non-zero value. With these settings of the MPDU delimiter, the Most Significant Bits (MSBs) of the MPDU length field may be extended into one or more of the reserved bits 1315 inside the MPDU delimiter.

In certain embodiments, the MPDU length field may be extended into the reserved bits as Least Significant Bits (LSBs). A capability indication may be added in certain embodiments by which STAs may indicate whether they can parse MPDU delimiters with an extended length field.

In certain embodiments, the delimiter type may be negotiated as part of the association or link setup procedure. The existing delimiter may be selected by STAs that do not support any of the enhanced features such as Jumbo frames, while the delimiter with an extended MPDU length field may be selected by STAs supporting enhanced features. Similarly, in certain embodiments, the supported ACK Types may be negotiable as well.

Frame Exchange Examples

Figure 14:
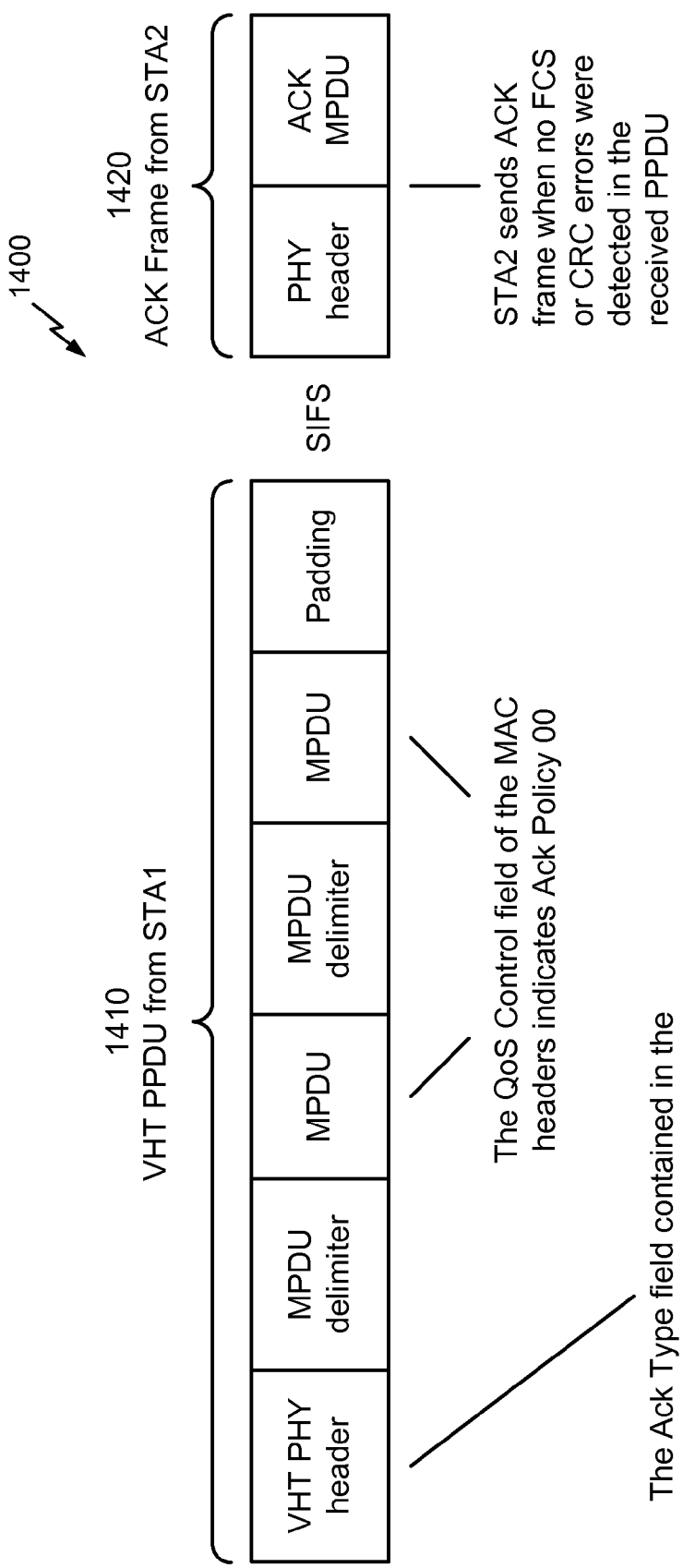
FIG. 14 illustrates a VHT frame exchange sequence with an ACK Type field equal to 0 (Normal ACK policy).
Figure 15:
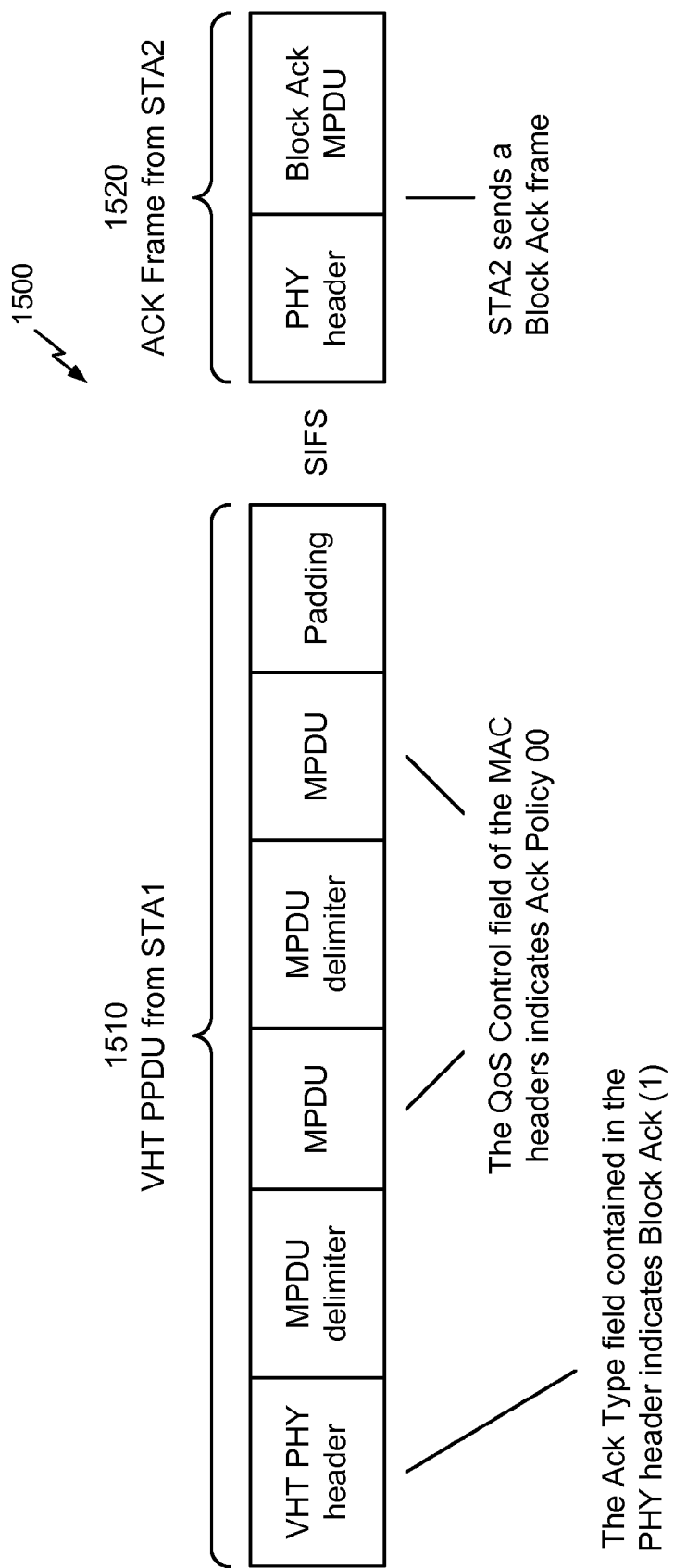
FIG. 15 illustrates a VHT frame exchange sequence with an ACK Type field equal to 1 (Block ACK policy).

FIG. 14 shows an example of a VHT frame exchange sequence 1400 with the ACK Type field indicating a Normal ACK policy, for example by being set to zero. In this example, the QoS Control field of the MAC headers indicates ACK Policy "00" as described herein in a VHT PPDU 1410 from STA1. An SIFS after the illustrated VHT PPDU 1410 from STA1, STA2 sends an ACK frame 1420 to STA1 upon determining that the received VHT PPDU 1410 is free of FCS and CRS errors FIG. 15 shows an example of a VHT frame exchange sequence 1500 with the ACK Type field indicating a Block ACK policy, for example by being set to one in a VHT PPDU 1510 from STA1. Again, the QoS Control field of the MAC headers indicates an ACK Policy "00." An SIFS after the illustrated VHT PPDU 1510 from STAT, STA2 sends a Block ACK frame 1520 to STA1.

Advantages of Implementing Normal ACK in VHT Frames

Figure 16:
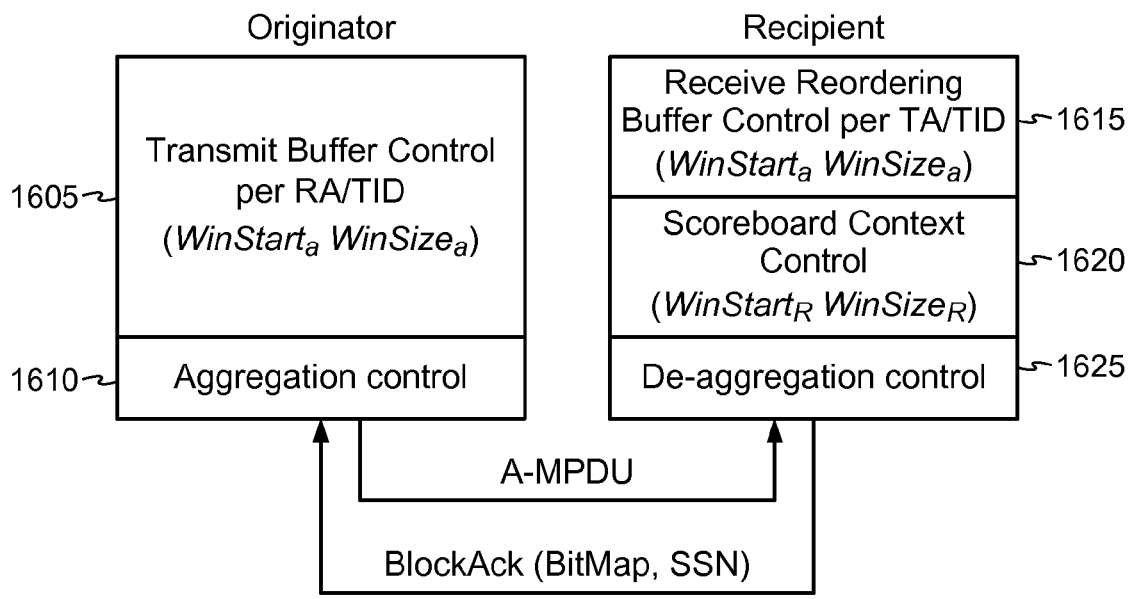
FIG. 16 illustrates the circuitry that may be required to implement Block ACK.

An advantage of Normal ACK may be that complexity associated with Block ACK does not need to be implemented at the transmitter and the receiver, while maintaining an acceptable link transmission rate. For example, FIG. 16 depicts the circuitry that may be required to implement Block ACK, as based on the IEEE 802.11n-2009 standard. By implementing a Normal ACK policy, the Transmit Buffer Control per RA/TID circuitry 1605 and Aggregation Control circuitry 1610 may be eliminated in the transmitter. The Receive Reordering Buffer Control per TA/TID circuitry 1615, the Scoreboard Context Control circuitry 1620 and the De-aggregation control circuitry 1625 may be eliminated in the receiver. Additionally, Receive Reordering Buffer Control circuitry 1615 typically controls a reorder buffer that may be included in the memory 306 of the STA 302. When Block ACK is not used, the Receive Reordering Buffer may be removed from the STA, which may simplify its implementation and reduce the memory requirement.

Block ACK typically offers a small advantage in that only MPDUs that were not received correctly may need to be retransmitted. This may be only part of the PPDU. Normal ACK typically requires the retransmission of the entire PPDU even when only a small part of the PPDU failed at the receiver.

Methodology Overview

Methodologies that may be implemented in accordance with the disclosed subject matter may be better appreciated with reference to various flow charts. For purposes of simplicity of explanation, methodologies are shown and described as a series of acts/operations. However, the claimed subject matter is not limited by the number or order of operations, as some operations may occur in different orders and/or at substantially the same time with other operations from what is depicted and described herein. Moreover, not all illustrated operations may be required to implement methodologies described herein. It is to be appreciated that functionality associated with operations may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture to facilitate transporting and transferring such methodologies to various devices. Those skilled in the art will understand and appreciate that a method could alternatively be represented as a series of interrelated states or events, such as in a state diagram.

Figure 17:
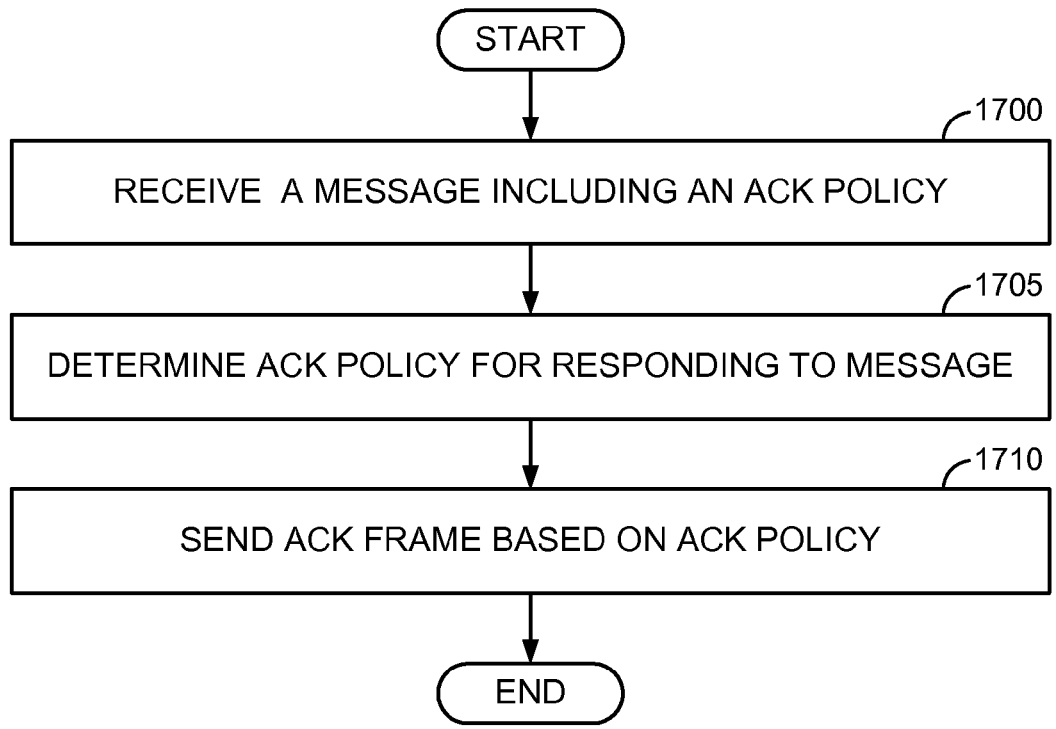
FIG. 17 is a flowchart illustrating a method of receiving messages from a STA that includes an ACK Policy field.

FIG. 17 is a flowchart illustrating a method of receiving messages from a STA that includes an ACK Policy that may be implemented by certain embodiments. In operation 1700, a receiving STA may receive a message that includes an acknowledgment policy. The acknowledgment policy may be included in the QoS Control field or may be specified by an ACK Type field, as previously discussed. Next, at 1705, the receiving STA may determine an ACK Policy to be used to respond to the message. This may involve decoding the ACK Policy bits and determining an implicitly transmitted ACK Policy based on certain pre-defined conditions. Then, at 1710, the receiving STA may send an appropriate ACK frame or Block ACK frame. The STA may include an appropriate ACK bitmap when a block acknowledgment agreement is in place with the sending STA.

Figure 18:
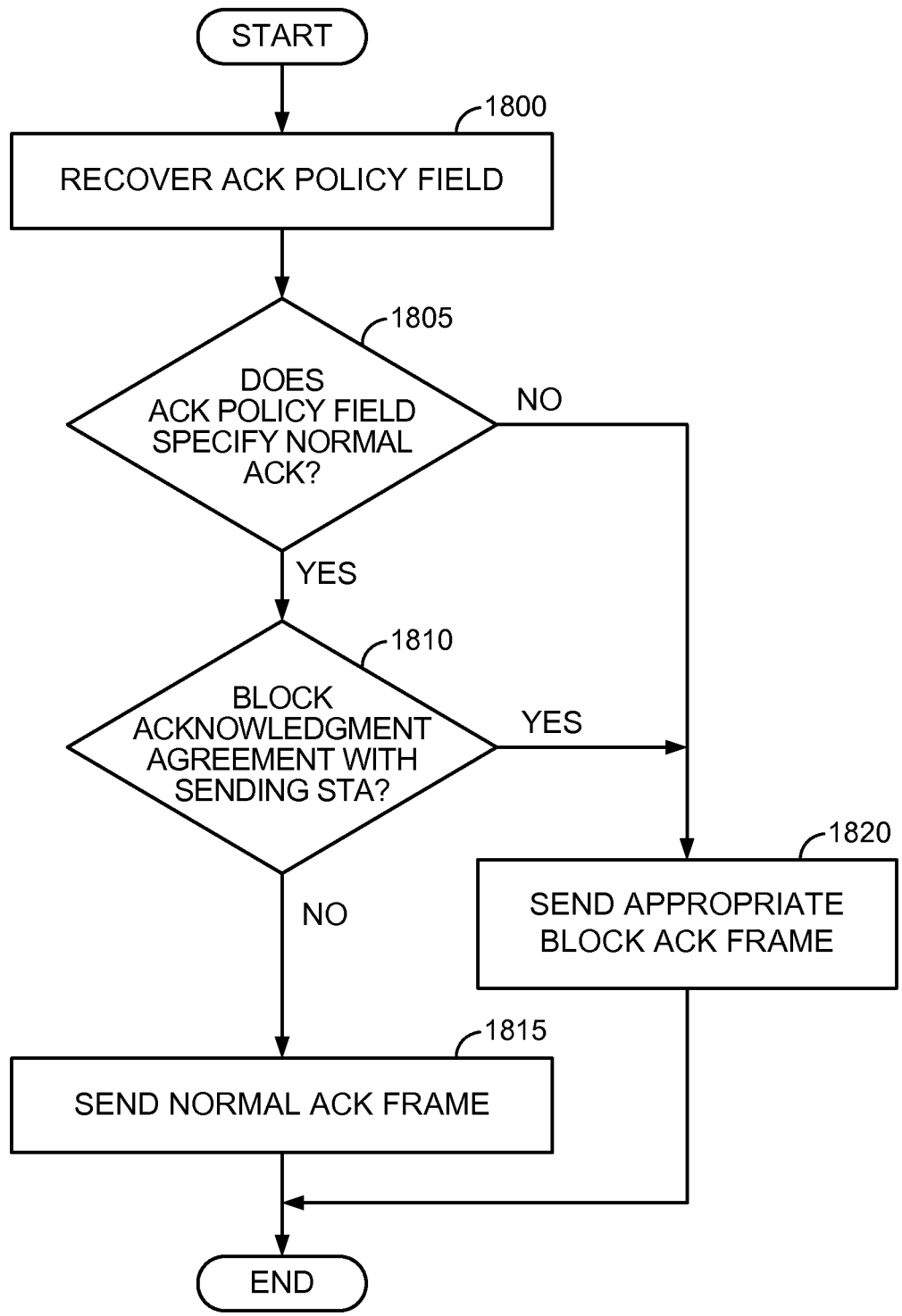
FIG. 18. is a flowchart illustrating a method that may be implemented in a STA to determine an ACK Policy for responding to a received message.

FIG. 18 is a flowchart illustrating a method that may be implemented in a STA to determine an ACK Policy for responding to a received message (e.g., as illustrated at 1705 of FIG. 17). Initially, at 1800, the receiving STA may recover an ACK Policy from a received message. The acknowledgment policy may be included in the QoS Control field or may be specified by an ACK Type field, as previously discussed. Next, at 1805, the receiving STA may determine whether the ACK Policy specifies that Normal ACK will be used.

If the STA determines at 1805 that a Normal ACK Policy is in effect, then the STA may branch to 1810. If the STA determines that a Normal ACK Policy is not specified, then the STA may branch to 1820.

At 1810, the STA may determine whether or not a block acknowledgment agreement is in place with the sending STA. If the STA determines that a block acknowledgment agreement exists with the sending station, the STA may branch to 1820. If the STA determines that no block acknowledgment agreement exists with the sending STA, at 1815, the receiving STA may send a Normal ACK frame in response to the received message. The Normal ACK frame may only be sent if no errors have been detected in the received message (e.g., no FCS or CRC errors). Then the method may be exited. In the alternative, at 1820, the receiving STA may send an appropriate Block ACK frame, which may include an appropriate ACK bitmap when a block acknowledgment agreement exists with the sending STA. Then the method exits.

Further Examples of Methodologies and Apparatus

Figure 19:
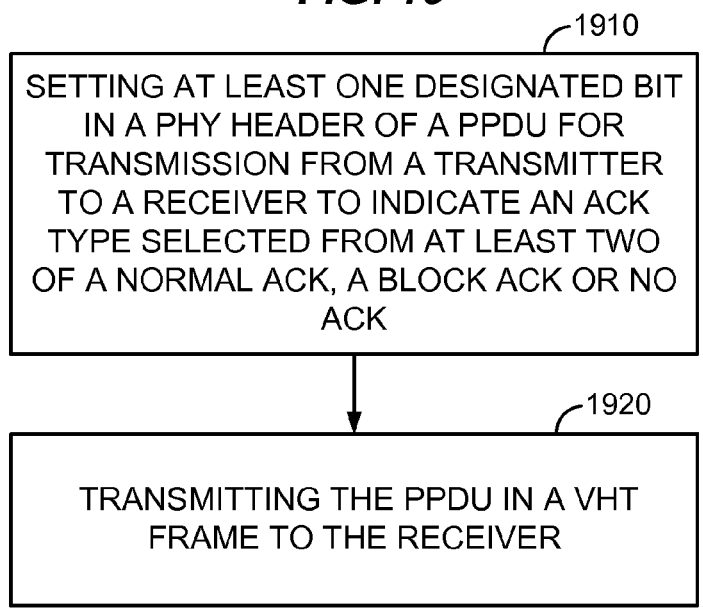

FIGS. 19-23 illustrate related methodologies for selectively enabling normal ACK and block ACK for wireless transmissions from a transmitting station, using a PPDU. Referring to FIG. 19, a method 1900 for selectively enabling normal ACK and block ACK for wireless transmissions from a station transmitting the PPDU may include a transmitting station setting 1910 at least one designated bit in a PHY header of a PPDU for transmission from a transmitter to a receiver to indicate an ACK type selected from at least two of a normal ACK, a Block ACK, or no ACK. For example, the method may include setting a single bit in the PHY header to indicate an ACK type selected from a normal ACK and a Block ACK. The method 1900 may further include transmitting 1920 the PPDU in a VHT frame to the receiver.

Figure 20:
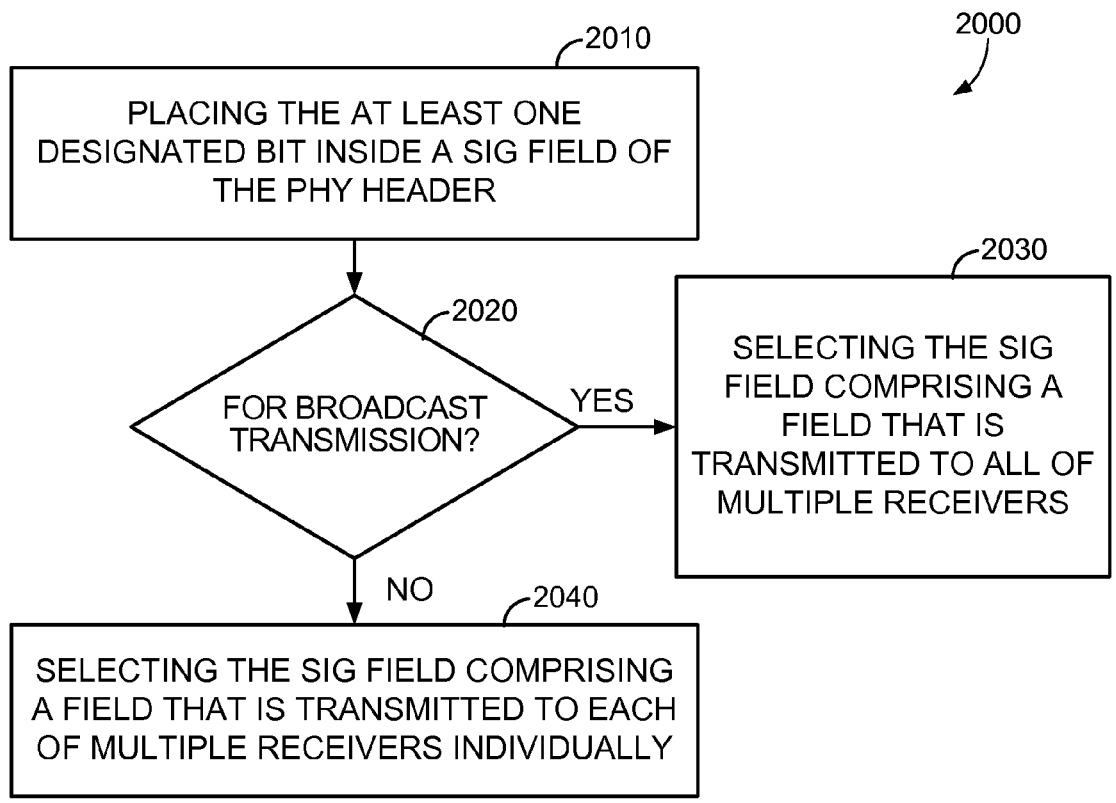

Additional operations 2000, 2100, and 2200 for selectively enabling normal ACK and block ACK for wireless transmissions from a transmitting station are illustrated in FIGS. 20-22, for performance by the transmitting station. One or more of these operations 2000, 2100, and 2200 may optionally be performed as part of the method 1900, or may further specify one ore more operations of the method 1900. The elements 2000, 2100, and 2200 may be performed in any operative order, or may be encompassed by a development algorithm without requiring a particular chronological order of performance. Operations illustrated in each figure are independently performed and not mutually exclusive. Therefore any one of such operations may be performed regardless of whether another downstream or upstream operation is performed. For example, if the method 1900 includes at least one of the operations 2100, then the method 1900 may terminate after the at least one operation, without necessarily having to include any subsequent downstream operation(s) that may be illustrated. Each of the additional operations 2000, 2100, and 2200 may pertain to different ones of various embodiments described above, while certain operations, for example the operations 2200 illustrated in FIG. 22, may pertain generally to all embodiments.

Referring to FIG. 20, additional operations 2000 that may be used with the method 1900 may include the transmitting station placing 2010 the at least one designated bit inside a SIG field of the PHY header. The station may select the SIG field depending on whether at 2020 the associated transmission will be broadcast for multiple receivers, or directed to individual receivers. If at 2020 the transmission will be broadcast, the additional operations may include selecting 2030 the SIG field comprising a field that is transmitted to all of multiple receivers. In an alternative, if at 2020 the transmission will not be broadcast, the additional operations 2000 may further include selecting 2040 the SIG field comprising a field that is transmitted to each of multiple receivers individually.

Referring to FIG. 21, additional operations 2100 that may be used with the method 1900 may include the transmitting station including 2110 at least one additional bit indicating an ACK policy in a MAC QoS control header contained in the PPDU. In the alternative, or in addition, the additional operations 2100 may include the station placing 2120 the at least one designated bit in a first location of a PHY payload of the PPDU. In a further alternative, or in addition, the additional operations 2100 may include the station placing 2130 the at least one designated bit in a reserved location of a MPDU delimiter field in the PPDU. According to another alternative, or in addition, the additional operations 2100 may include setting 2140 the at least one designated bit in a MAC header interposed between divided parts of the PHY header.

Referring to FIG. 22, additional operations 2200 that may be used with the method 1900 may generally include the station setting 2210 the at least one designated bit to indicate a normal ACK to avoid implementing a Block ACK. In the alternative, or in addition, the additional operations 2200 may include the station transmitting 2220 the PPDU to enable use of a normal ACK without requiring prior negotiation of a BA agreement with the receiver.

With reference to FIG. 23, there is provided an exemplary apparatus 2300 that may be configured as a transmitting station in a wireless network, or as a processor or similar device for use within the transmitting station, for selectively enabling one of a normal ACK and block ACK for wireless transmissions, using a PPDU. The apparatus 2300 may include functional blocks that can represent functions implemented by a processor, software, or combination thereof (e.g., firmware).

As illustrated, in one embodiment, the apparatus 2300 may include an electrical component or module 2302 for setting at least one designated bit in a PHY header of a PPDU for transmission from a transmitter to a receiver to indicate an ACK type selected from at least two of a normal ACK OR a Block ACK, or no ACK. For example, the electrical component 2302 may include at least one control processor coupled to a transceiver or the like and to a memory with instructions for configuring a PPDU. The apparatus 2300 may include an electrical component 2304 for transmitting the PPDU in a VHT frame to the receiver. For example, the electrical component 2304 may include at least one control processor coupled to a memory holding instructions for transmitting VHT frames according to a protocol. The apparatus 2300 may include similar electrical components for performing any or all of the additional operations 2000, 2100, and 2200 described in connection with FIGS. 20-22, which for illustrative simplicity are not shown in FIG. 23.

In related aspects, the apparatus 2300 may optionally include a processor component 2310 having at least one processor, in the case of the apparatus 2300 configured as a transmitting station. The processor 2310, in such case, may be in operative communication with the components 2302-2304 or similar components via a bus 2312 or similar communication coupling. The processor 2310 may effect initiation and scheduling of the processes or functions performed by electrical components 2302-2304.

In further related aspects, the apparatus 2300 may include a transceiver component 2314 for communicating with a receiving station. The apparatus 2300 may optionally include a component for storing information, such as, for example, a memory device/component 2316. The computer readable medium or the memory component 2316 may be operatively coupled to the other components of the apparatus 2300 via the bus 2312 or the like. The memory component 2316 may be adapted to store computer readable instructions and data for performing the activity of the components 2302-2304, and subcomponents thereof, or the processor 2310, the additional operations 2000, 2100, and 2200, or the methods disclosed herein. The memory component 2316 may retain instructions for executing functions associated with the components 2302-2304. While shown as being external to the memory 2316, it is to be understood that the components 2302-2304 can exist within the memory 2316.

FIGS. 24-26 illustrate related methodologies for selecting one of a normal ACK and block ACK for wireless transmissions, using a PPDU. Referring to FIG. 24, a method 2400 for selecting a normal ACK and block ACK for wireless transmissions at a station receiving a PPDU may include receiving 2410 a PPDU in a VHT frame from a transmitter. The method 2400 may further include the receiving station determining 2420 an ACK selected from a normal ACK or a Block ACK in response to a designated bit contained in a PHY header of the PPDU. For example, the receiving station may determine that a bit in the PHY header is set to a value indicating "enable normal ACK." The receiver may then provide a normal ACK to the transmitting station to acknowledge the PPDU received at 2410. For further example, if the receiving station determines that a bit in the PHY header is set to a value indicating "enable Block ACK," the receiver may then provide a Block ACK to the transmitting station.

Additional operations 2500 and 2600 for selecting one of a normal ACK and block ACK at a receiving station are illustrated in FIGS. 25-26. One or more of these operations 2500 and 2600 may optionally be performed as part of the method 2400, or may further specify one or more operations of the method 2400. The elements 2500 and 2600 may be performed in any operative order, or may be encompassed by a development algorithm without requiring a particular chronological order of performance. Operations illustrated in each figure are independently performed and not mutually exclusive. Therefore any one of such operations may be performed regardless of whether another downstream or upstream operation is performed. For example, if the method 2400 includes at least one of the operations 2600, then the method 2400 may terminate after the at least one operation, without necessarily having to include any subsequent downstream operation(s) that may be illustrated. Each of the additional operations 2500 and 2600 may pertain to different ones of various embodiments described above.

Referring to FIG. 25, additional operations 2500 that may be used with the method 2400 may include the receiving station receiving 2510 the designated bit inside SIG field of the PHY header. In the alternative, or in addition, the additional operations 2500 may include the station receiving 2520 at least one additional bit indicating an ACK policy in a MAC QoS control header contained in the PPDU.

Referring to FIG. 26, additional operations 2600 that may be used with the method 2400 may generally include the station receiving 2610 the designated bit in a first location of a PHY payload of the PPDU. In the alternative, or in addition, the additional operations 2600 may include the station receiving 2620 the designated bit in a reserved location of an MPDU delimiter field in the PPDU. In the alternative, or in addition, the additional operations 2600 may include the station receiving 2630 the designated bit in a MAC header interposed between divided parts of the PHY header. Generally, additional operations 2600 may include the receiving station providing 2640 an ACK to the transmitting station, in response to a value of the designated bit contained in the PHY header of the PPDU.

Figure 27:
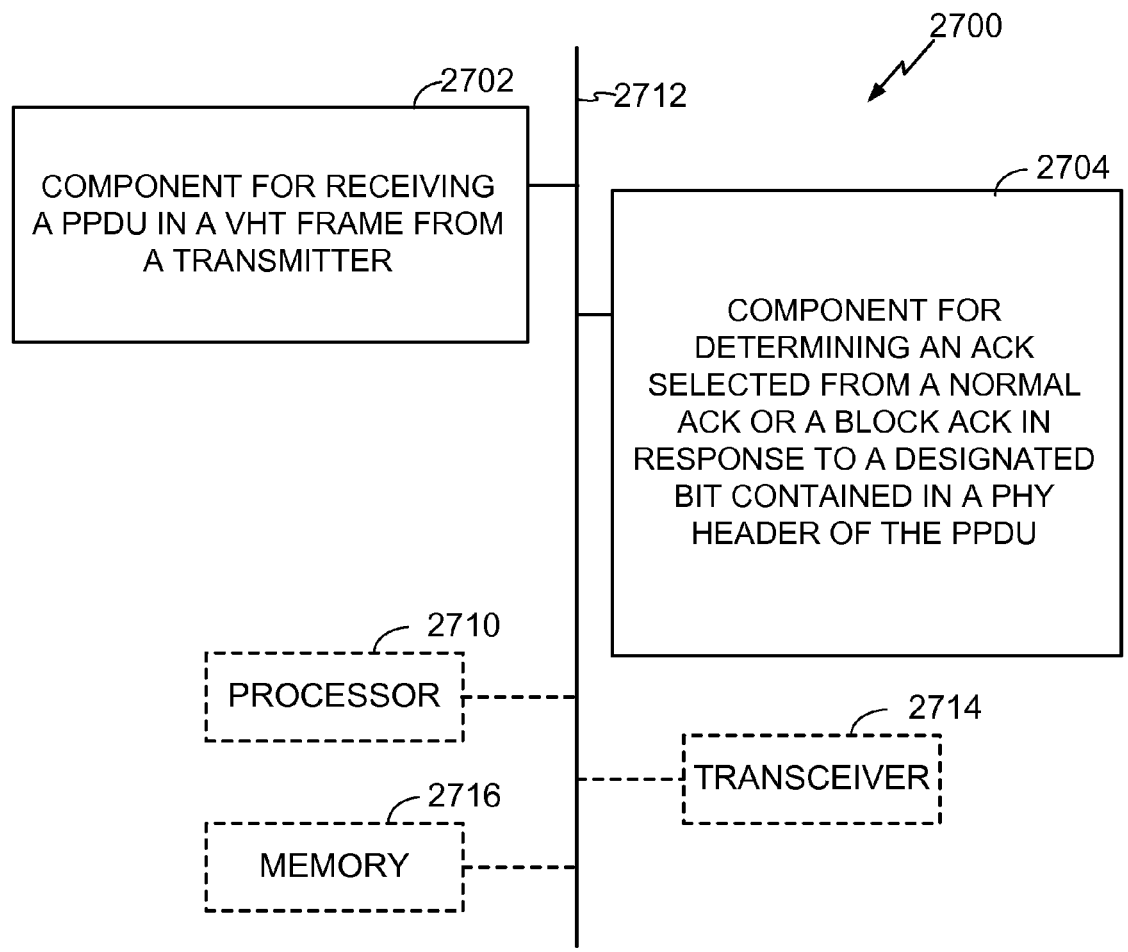
FIG. 27 is a block diagram illustrating a system for performing a method or methods as shown in FIGS. 24-26.

With reference to FIG. 27, there is provided an exemplary apparatus 2700 that may be configured a receiving station in a wireless network, or as a processor or similar device for use within the receiving station, for selecting one of a normal ACK and block ACK using one or more bits received in a PPDU. The apparatus 2700 may include functional blocks that can represent functions implemented by a processor, software, or combination thereof (e.g., firmware).

As illustrated, in one embodiment, the apparatus 2700 may include an electrical component or module 2702 for receiving a PPDU in a VHT frame from a transmitter. For example, the electrical component 2702 may include at least one control processor coupled to a transceiver or the like and to a memory with instructions for receiving a PPDU according to a communications protocol. The apparatus 2700 may include an electrical component 2704 for determining an ACK selected from a normal ACK or a Block ACK in response to a designated bit contained in a PHY header of the PPDU. For example, the electrical component 2704 may include at least one control processor coupled to a memory holding instructions for processing information in a PHY header to determine the value of a bit indicative of an ACK type. The apparatus 2700 may include similar electrical components for performing any or all of the additional operations 2500 and 2600 described in connection with FIGS. 25-26, which for illustrative simplicity are not shown in FIG. 27.

In related aspects, the apparatus 2700 may optionally include a processor component 2710 having at least one processor, in the case of the apparatus 2700 configured as a receiving station. The processor 2710, in such case, may be in operative communication with the components 2702-2704 or similar components via a bus 2712 or similar communication coupling. The processor 2710 may effect initiation and scheduling of the processes or functions performed by electrical components 2702-2704.

In further related aspects, the apparatus 2700 may include a transceiver component 2714 for communicating with a transmitting station. The apparatus 2700 may optionally include a component for storing information, such as, for example, a memory device/component 2716. The computer readable medium or the memory component 2716 may be operatively coupled to the other components of the apparatus 2700 via the bus 2712 or the like. The memory component 2716 may be adapted to store computer readable instructions and data for performing the activity of the components 2702-2704, and subcomponents thereof, or the processor 2710, the additional operations 2500 and 2600, or the methods disclosed herein. The memory component 2716 may retain instructions for executing functions associated with the components 2702-2704. While shown as being external to the memory 2716, it is to be understood that the components 2702-2704 can exist within the memory 2716.

General Remarks

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logic blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor means, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM or other optical disc medium, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The functions described may be implemented in hardware, software, firmware or any combination thereof. If implemented in software, the functions may be stored as one or more instructions on a computer-readable medium. A storage medium may be any available non-transient medium holding information that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

It is to be understood that the claims are not limited to the precise configuration and components illustrated above. Various modifications, changes and variations may be made in the arrangement, operation and details of the methods and apparatus described above without departing from the scope and spirit of the present disclosure.

What is claimed is:

1. A method for selectively enabling normal acknowledgement (ACK) and block ACK (BA) for wireless transmissions using a Physical Layer Protocol Data Unit (PPDU), the method comprising:
   setting at least one designated bit in a Physical Layer (PHY) header of the PPDU in a radio frame for transmission from a transmitter to a plurality of receivers to indicate a single ACK type for response, including any of a normal ACK, a Block ACK (BA), or no ACK, wherein the at least one designated bit indicating the single ACK type for response applies to every Media Access Control (MAC) Protocol Data Unit (MPDU) in the PPDU, and wherein an indication of the single ACK type for response is not contained in any MPDU of the PPDU; and
   transmitting the PPDU in the radio frame to the plurality of receivers.

2. The method of claim 1, further comprising placing the at least one designated bit inside a Signal (SIG) field of the PHY header.

3. The method of claim 2, further comprising selecting the SIG field comprising a field that is transmitted to the plurality of receivers.

4. The method of claim 1, further comprising including at least one additional bit indicating an ACK policy in a Media Access Control (MAC) Quality of Service (QoS) control header contained in the PPDU.

5. The method of claim 1, further comprising placing the at least one designated bit in a first location of a Physical Layer (PHY) payload of the PPDU.

6. The method of claim 1, further comprising placing the at least one designated bit in a reserved location of a Media Access Control Data Unit (MPDU) delimiter field in the PPDU.

7. The method of claim 1, further comprising setting the at least one designated bit to indicate a normal ACK to avoid implementing a BA.

8. The method of claim 1, further comprising transmitting the PPDU to enable use of a normal ACK without requiring prior negotiation of a BA agreement with the plurality of receivers.

9. The method of claim 1, further comprising setting the at least one designated bit in a Media Access Control (MAC) header interposed between divided parts of the PHY header.

10. A system for selectively enabling normal acknowledgement (ACK) and block ACK (BA) for wireless transmissions using a Physical Layer Protocol Data Unit (PPDU), the system comprising:
- means for setting at least one designated bit in a Physical Layer (PHY) header of the PPDU in a radio frame for transmission from a transmitter to a plurality of receivers to indicate a single ACK type for response, including any of a normal ACK, a Block ACK (BA), or no ACK, wherein the at least one designated bit indicating the single ACK type for response applies to every Media Access Control (MAC) Protocol Data Unit (MPDU) in the PPDU, and wherein an indication of the single ACK type for response is not contained in any MPDU of the PPDU;
- means for transmitting the PPDU in the radio frame to the plurality of receivers.

11. A system for selectively enabling normal acknowledgement (ACK) and block ACK (BA) for wireless transmissions using a Physical Layer Protocol Data Unit (PPDU), comprising:
- at least one processor configured for setting at least one designated bit in a Physical Layer (PHY) header of the PPDU in a radio frame for transmission from a transmitter to a plurality of receivers to indicate a single ACK type for response, including any of a normal ACK, a Block ACK (BA), or no ACK, wherein the at least one designated bit indicating the single ACK type for response applies to every Media Access Control (MAC) Protocol Data Unit (MPDU) in the PPDU, and wherein an indication of the single ACK type for response is not contained in any MPDU of the PPDU, and transmitting the PPDU in the radio frame to the plurality of receivers; and
- a memory coupled to the at least one processor for storing data.

12. The system of claim 11, wherein the processor is further configured for placing the at least one designated bit inside a Signal (SIG) field of the PHY header.

13. The system of claim 12, wherein the processor is further configured for selecting the SIG field comprising a field that is transmitted to the plurality of receivers.

14. The system of claim 11, wherein the processor is further configured for including at least one additional bit indicating an ACK policy in a Media Access Control (MAC) Quality of Service (QoS) control header contained in the PPDU.

15. The system of claim 11, wherein the processor is further configured for placing the at least one designated bit in a first location of a Physical Layer (PHY) payload of the PPDU.

16. The system of claim 11, wherein the processor is further configured for placing the at least one designated bit in a reserved location of an Media Access Control Data Unit (MPDU) delimiter field in the PPDU.

17. The system of claim 11, wherein the processor is further configured for setting the at least one designated bit to indicate a normal ACK to avoid implementing a BA.

18. The system of claim 11, wherein the processor is further configured for transmitting the PPDU to enable use of a normal ACK without requiring prior negotiation of a BA agreement with the plurality of receivers.

19. The system of claim 11, wherein the processor is further configured for setting the at least one designated bit in a Media Access Control (MAC) header interposed between divided parts of the PHY header.

20. A non-transitory computer-readable medium comprising code for: setting at least one designated bit in a Physical Layer (PHY) header of a Physical Layer Protocol Data Unit (PPDU) in a radio frame for transmission from a transmitter to a plurality of receivers to indicate a single ACK type for response, including any of a normal ACK, a Block ACK (BA), or no ACK, wherein the at least one designated bit indicating the single ACK type for response applies to every Media Access Control (MAC) Protocol Data Unit (MPDU) in the PPDU, and wherein an indication of the single ACK type for response is not contained in any MPDU of the PPDU, and transmitting the PPDU in the radio frame to the plurality of receivers.

21. A method for selecting one of normal acknowledgement (ACK) and block ACK (BA) in response to receiving a wireless transmission using a Physical Layer Protocol Data Unit (PPDU), the method comprising:
- receiving the PPDU in a radio frame sent from a transmitter to a plurality of receivers; and
- determining an ACK including either of a normal ACK or a BA in response to at least one designated bit contained in a Physical Layer (PHY) header of the PPDU, wherein the at least one designated bit indicates a single ACK type for response that applies to every Media Access Control (MAC) Protocol Data Unit (MPDU) in the PPDU, and wherein an indication of the single ACK type for response is not contained in any MPDU of the PPDU.

22. The method of claim 21, further comprising receiving the at least one designated bit inside a Signal (SIG) field of the PHY header.

23. The method of claim 21, further comprising receiving at least one additional bit indicating an ACK policy in a Media Access Control (MAC) Quality of Service (QoS) control header contained in the PPDU.

24. The method of claim 21, further comprising receiving the at least one designated bit in a first location of a Physical Layer (PHY) payload of the PPDU.

25. The method of claim 21, further comprising receiving the at least one designated bit in a reserved location of a Media Access Control Data Unit (MPDU) delimiter field in the PPDU.

26. The method of claim 21, further comprising receiving the at least one designated bit in a Media Access Control (MAC) header interposed between divided parts of the PHY header.

27. The method of claim 21, further comprising providing the ACK to the transmitter.

28. A system for selecting one of normal acknowledgement (ACK) and block ACK (BA) in response to receiving a wireless transmission using a Physical Layer Protocol Data Unit (PPDU), the system comprising:
- means for receiving the PPDU in a radio frame sent from a transmitter to a plurality of receivers; and
- means for determining an ACK including either of a normal ACK or a BA in response to at least one designated bit contained in a Physical Layer (PHY) header of the PPDU, wherein the at least one designated bit indicates a single ACK type for response that applies to every Media Access Control (MAC) Protocol Data Unit (MPDU) in the PPDU, and wherein an indication of the single ACK type for response is not contained in any MPDU of the PPDU.

29. A system for selecting one of normal acknowledgement (ACK) and block ACK (BA) in response to receiving a wireless transmission using a Physical Layer Protocol Data Unit (PPDU), comprising:
  at least one processor configured for receiving the PPDU in a radio frame sent from a transmitter to a plurality of receivers, and determining an ACK including either of a normal ACK or a BA in response to at least one designated bit contained in a Physical Layer (PHY) header of the PPDU, wherein the at least one designated bit indicates a single ACK type for response that applies to every Media Access Control (MAC) Protocol Data Unit (MPDU) in the PPDU, and wherein an indication of the single ACK type for response is not contained in any MPDU of the PPDU; and
  a memory coupled to the at least one processor for storing data.

30. The system of claim 29, wherein the processor is further configured for receiving the at least one designated bit inside a Signal (SIG) field of the PHY header.

31. The system of claim 29, wherein the processor is further configured for receiving at least one additional bit indicating an ACK policy in a Media Access Control (MAC) Quality of Service (QoS) control header contained in the PPDU.

32. The system of claim 29, wherein the processor is further configured for receiving the at least one designated bit in a first location of a Physical Layer (PHY) payload of the PPDU.

33. The system of claim 29, wherein the processor is further configured for receiving the at least one designated bit in a reserved location of a Media Access Control Data Unit (MPDU) delimiter field in the PPDU.

34. The system of claim 29, wherein the processor is further configured for receiving the at least one designated bit in a Media Access Control (MAC) header interposed between divided parts of the PHY header.

35. The system of claim 29, wherein the processor is further configured for providing the ACK to the transmitter.

36. A non-transitory computer-readable medium comprising code for: receiving a Physical Layer Protocol Data Unit (PPDU) in a radio frame sent from a transmitter to a plurality of receivers, and determining either of normal acknowledgement (ACK) and block ACK (BA) in response to at least one designated bit contained in a Physical Layer (PHY) header of the PPDU, wherein the at least one designated bit indicates a single ACK type for response that applies to every Media Access Control (MAC) Protocol Data Unit (MPDU) in the PPDU, and wherein an indication of the single ACK type for response is not contained in any MPDU of the PPDU.

* * * * *